US012657287B2

(12) United States Patent
Nelson

(10) Patent No.: US 12,657,287 B2
(45) Date of Patent: Jun. 16, 2026

(54) SYSTEM AND METHOD FOR LOADING ENCLAVE-AWARE EXECUTABLES

(71) Applicant: Mark Nelson, Honolulu, HI (US)

(72) Inventor: Mark Nelson, Honolulu, HI (US)

(73) Assignee: APPLIED ENCLAVES LLC, Honolulu, HI (US)

( * ) Notice: Subject to any disclaimer, the term of this patent is extended or adjusted under 35 U.S.C. 154(b) by 0 days.

(21) Appl. No.: 19/029,931

(22) Filed: Jan. 17, 2025

(65) Prior Publication Data

US 2025/0291895 A1 Sep. 18, 2025

Related U.S. Application Data

(60) Provisional application No. 63/565,907, filed on Mar. 15, 2024.

(51) Int. Cl.
| | |
|---|---|
| *G06F 21/53* | (2013.01) |
| *G06F 8/41* | (2018.01) |
| *G06F 21/54* | (2013.01) |
| *G06F 21/60* | (2013.01) |

(52) U.S. Cl.
CPC ................ *G06F 21/53* (2013.01); *G06F 8/41* (2013.01); *G06F 21/54* (2013.01); *G06F 21/602* (2013.01); *G06F 2221/033* (2013.01); *G06F 2221/2105* (2013.01)

(58) Field of Classification Search
None
See application file for complete search history.

(56) References Cited

U.S. PATENT DOCUMENTS

| | | | |
|---|---|---|---|
| 9,087,200 | B2 | 7/2015 | McKeen et al. |
| 9,904,803 | B2 | 2/2018 | Xing et al. |
| 10,049,048 | B1 | 8/2018 | Horovitz et al. |

(Continued)

OTHER PUBLICATIONS

Tsai et al, Graphene-SGX: A Practical Library OS for Unmodified Applications on SGX, 2017, USENIX Association, 15 Pages total (Year: 2017).*

(Continued)

*Primary Examiner* — Christopher C Harris
(74) *Attorney, Agent, or Firm* — Jacob M. Ward; Ward Law Office LLC

(57) ABSTRACT

Ways for enhancing security in computing environments through automating the execution of enclaves are provided. A system includes an enclave-aware loader, an enclave-aware Application Binary Interface (eABI), an eABI-aware runtime, a usermode process, and an enclave-aware executable including protected and unprotected sections. The enclave-aware loader may analyze the enclave-aware executable, create an instance of an enclave in the memory, add a portion of the enclave-aware executable into the enclave, and initialize the enclave. The enclave-aware loader may provision the usermode process to interoperate with the enclave. The enclave-aware loader may load the protected sections into the enclave, and the unprotected sections into common memory. The enclave-aware loader may load the eABI-aware runtime into memory and initialize for interoperability between the eABI and the enclave. The system may also include an enclave-aware compiler that may translate generic source code into an enclave-aware executable.

17 Claims, 21 Drawing Sheets

314

(56)                References Cited

U.S. PATENT DOCUMENTS

| | | | |
|---|---|---|---|
| 10,102,380 | B2 | 10/2018 | McKeen et al. |
| 10,439,803 | B2 | 10/2019 | Lange |
| 10,554,634 | B2 | 2/2020 | Bowman et al. |
| 10,565,370 | B2 | 2/2020 | Narendra Trivedi et al. |
| 10,956,585 | B2 | 3/2021 | Ortiz et al. |
| 11,017,113 | B2 | 5/2021 | Vaswani et al. |
| 12,067,111 | B2 | 8/2024 | Saroiu et al. |
| 2013/0086570 | A1* | 4/2013 | Blainey ................. G06F 9/3017 |
| | | | 717/165 |
| 2013/0198853 | A1 | 8/2013 | McKeen et al. |
| 2014/0020112 | A1 | 1/2014 | Goodes |
| 2015/0089502 | A1 | 3/2015 | Horovitz et al. |
| 2015/0121536 | A1 | 4/2015 | Xing et al. |
| 2017/0317832 | A1 | 11/2017 | Surdu |
| 2018/0211034 | A1* | 7/2018 | Costa ................. G06F 9/45558 |
| 2018/0212966 | A1 | 7/2018 | Costa |
| 2019/0180006 | A1 | 6/2019 | Bojjireddy et al. |
| 2020/0184070 | A1 | 6/2020 | Kim et al. |
| 2021/0019393 | A1* | 1/2021 | Michalevsky .......... G06F 21/57 |
| 2021/0049009 | A1 | 2/2021 | Sun et al. |
| 2021/0064765 | A1 | 3/2021 | Lapworth |
| 2021/0224426 | A1* | 7/2021 | Cui ....................... G06F 1/3243 |
| 2021/0232676 | A1* | 7/2021 | Gingell ................... G06F 21/62 |
| 2022/0012369 | A1 | 1/2022 | Constable et al. |
| 2022/0222337 | A1* | 7/2022 | Doshi ..................... G06F 21/53 |
| 2023/0018585 | A1 | 1/2023 | Liljestrand et al. |
| 2023/0039096 | A1 | 2/2023 | Sapek et al. |
| 2023/0217356 | A1* | 7/2023 | Cogan ................... H04W 12/02 |
| | | | 370/392 |
| 2023/0273991 | A1 | 8/2023 | Xing et al. |
| 2024/0037217 | A1 | 2/2024 | Kaul et al. |
| 2024/0119138 | A1* | 4/2024 | Li ......................... G06F 21/121 |
| 2024/0241939 | A1 | 7/2024 | Almeida |
| 2024/0320308 | A1 | 9/2024 | Hwang et al. |
| 2025/0036751 | A1* | 1/2025 | Xing ................... G06F 9/30145 |

OTHER PUBLICATIONS

Lind, Glamdring: Automatic Application Partitioning for Intel SGX, 2017, USENIX Association, 15 Pages Total (Year: 2017).*
Intel® SGX Software Guard Extensions Overview. https://www. intel.com/content/www/us/en/developer/tools/software-guard-extensions/linux-overview.html.
Intel® Software Guard Extensions Programming Reference. Oct. 2014. https://www.intel.com/content/dam/develop/external/US/en/documents/329298-002-629101.pdf.
Intel® Software Guard Extensions SDK for Linux OS. https:// download.01.org/intel-sgx/latest/linux-latest/docs/Intel_SGX_Developer_Reference_Linux_2.26_Open_Source.pdf.
The GNU C Reference Manual. https://www.gnu.org/software/gnu-c-manual/gnu-c-manual.html.
Mckeen, Frank, et al., "Innovative instructions and software model for isolated execution.", Intel Corporation, HASP '13: Proceedings of the 2nd International Workshop on Hardware and Architectural Support for Security and Privacy Article No. 10, p. 1, 2013, https://doi.org/10.1145/2487726.2488368.
Written Opinion of the International Searching Authority dated Mar. 31, 2025.
Tsai, Chia-Che, et al., "Graphene-SGX: A practical library {OS} for unmodified applications on SGX", In 2017 USENIX annual technical conference (USENIX ATC 17), pp. 645-658. 2017, https:// www.usenix.org/conference/atc17/technical-sessions/presentation/tsai.
Lind, Joshua, et al., "Glamdring: Automatic application partitioning for intel SGX", In 2017 USENIX Annual Technical Conference (USENIX ATC 17), pp. 285-298. 2017, https://www.usenix.org/conference/atc17/technical-sessions/presentation/lind.

* cited by examiner

| Accessibility of Instructions & Data | | Outside enclave A | Inside enclave A |
|---|---|---|---|
| From inside enclave A | Execute instructions | No | Yes |
| | Access data | No | Read+write |
| From outside enclave A | Execute instructions | Yes | No |
| | Access data | Read+write | Read+write |
| Execute a restricted instruction | | Yes | No |
| From inside enclave B | Execute instructions | No | No |
| | Access data | No | No |

FIG . 1 (prior art)

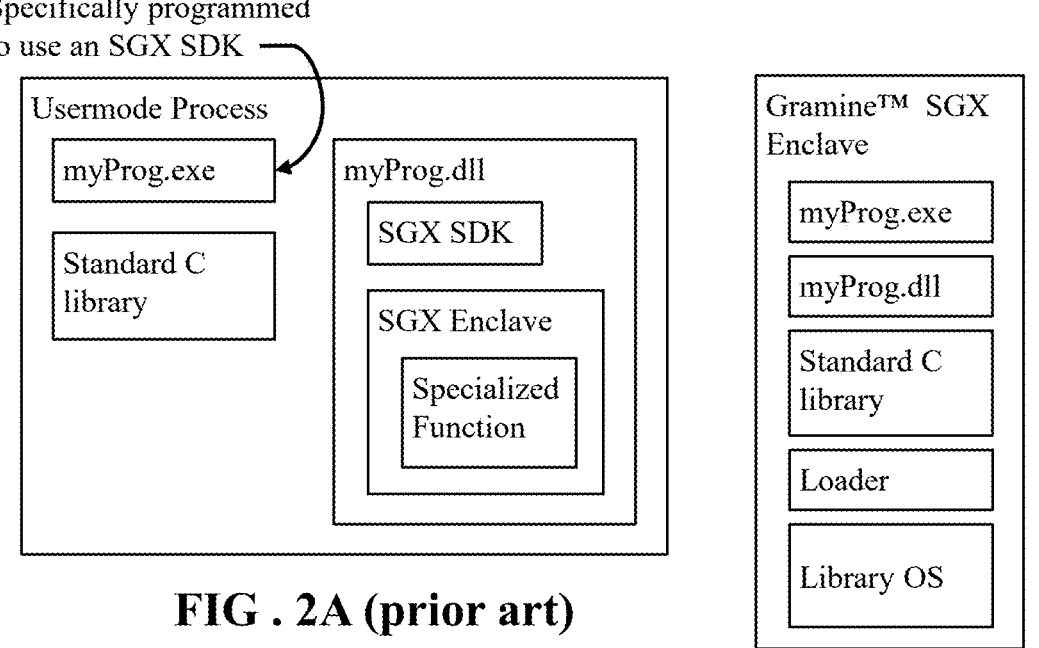

Specifically programmed to use an SGX SDK

Usermode Process myProg.exe

Standard C library myProg.dll

SGX SDK

SGX Enclave

Specialized Function

FIG . 2A (prior art)

Gramine™ SGX Enclave myProg.exe myProg.dll

Standard C library

Loader

Library OS

FIG . 2B (prior art)

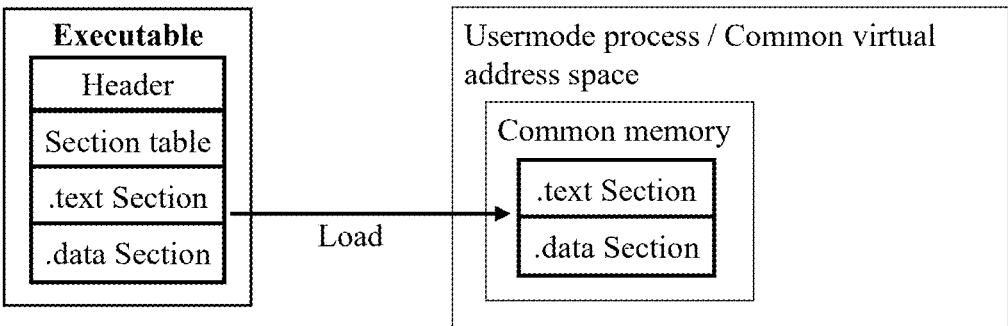
FIG . 7A (prior art)
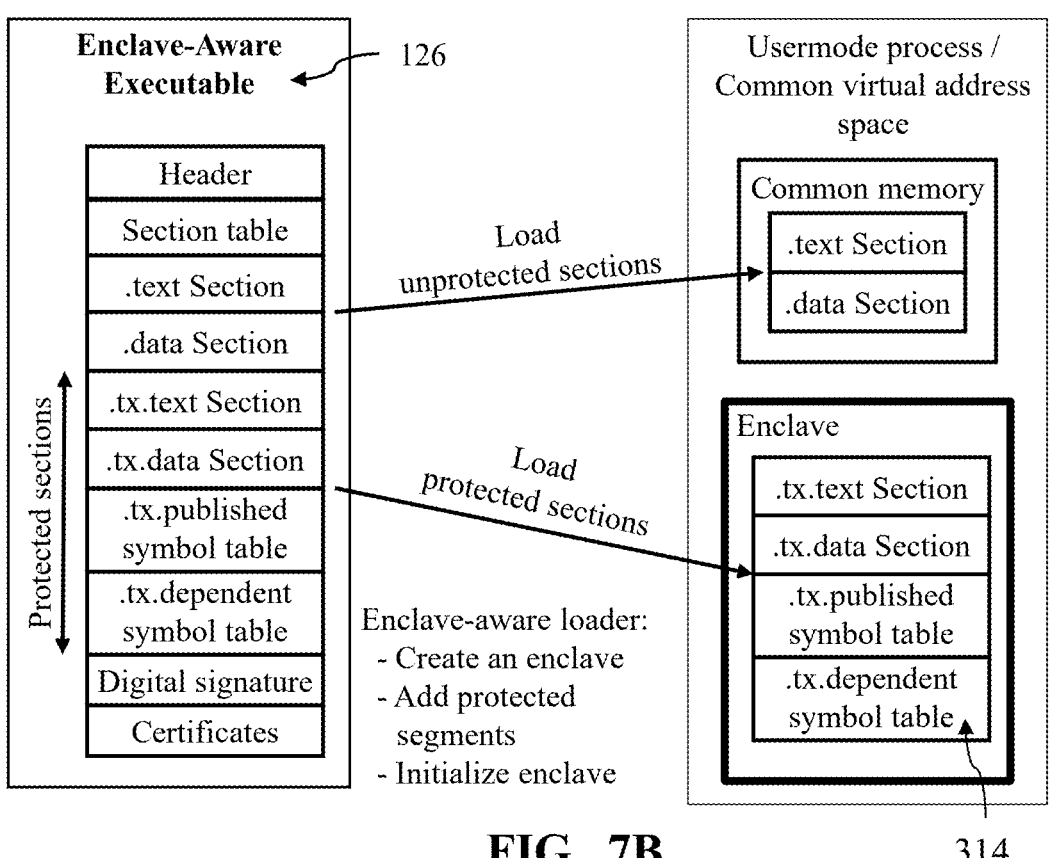
FIG . 7B                                                   314

Computing Environment 102

274

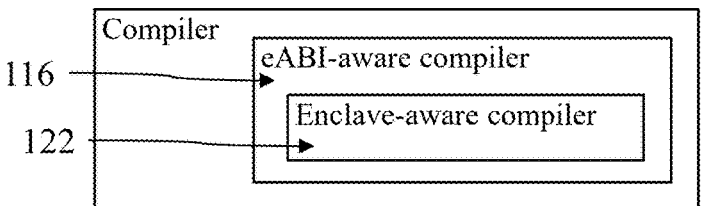

| Desired security | Data security modes |
|---|---|
| Maximum security symbol | Only encryption with validation mode 136 is available |
| A routine symbol | All data security modes are available |
| The developer decides that the symbol does not require safety or security protections | Only a null data security mode is available, which reduces the attack surface and makes the executable smaller. |

FIG . 13A

| Data Security Mode 130 | Description | Provisional Patent Application Terminology |
|---|---|---|
| Plaintext mode 132 | Notes are passed without encryption | Fast mode |
| Validation mode 136 | The enclave is validated or revalidated before the note is passed, but the note is not encrypted. | N/A |
| Encryption mode 134 | The note is encrypted as it is passed between enclaves. | Secure mode |
| Encryption + validation mode 138 | Before each external call the called enclave is validated (or attested). A new encryption key is generated for the call and the note is encrypted with this new, short-term key, as it is passed between enclaves. | Ultra secure mode |

FIG . 13B

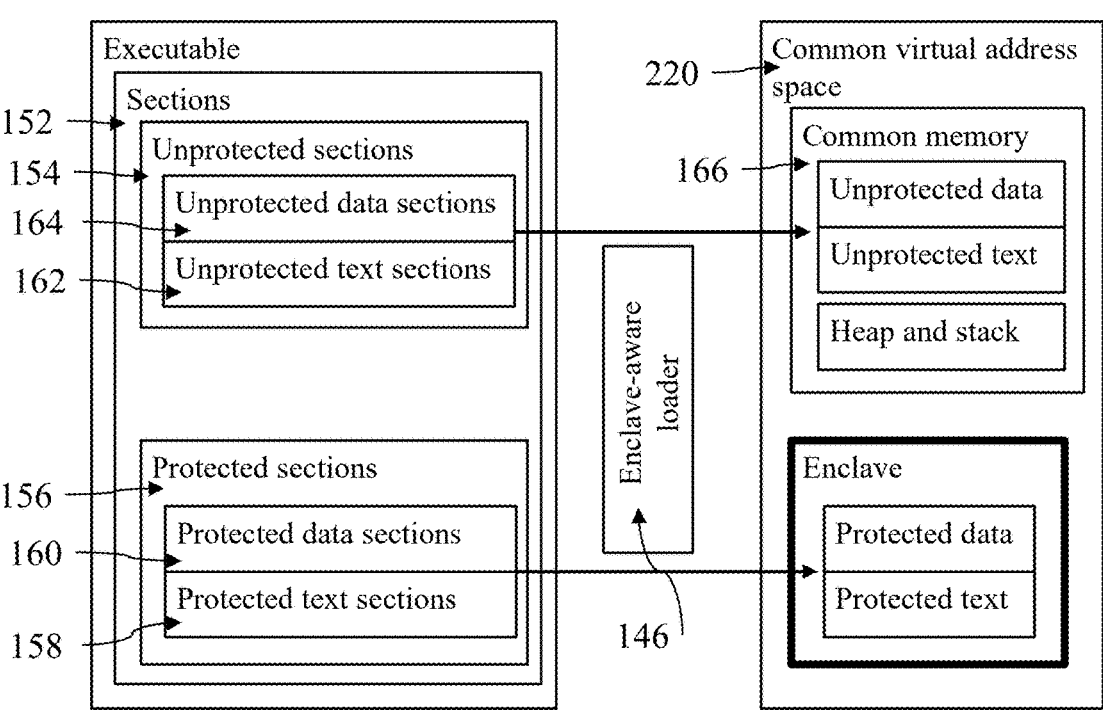

FIG . 14

| Storage and interoperability | Pros | Cons |
|---|---|---|
| Store data in common memory | Easy access for all executables | Unsafe and insecure. Any executable can read/write this data at any time. |
| Store data in an enclave | Safe and secure. The enclave has read-write access to the data. | None of the executable code outside the enclave has access to this data. |
| Pass a copy of the data from one enclave to another via a note | Safer, more secure and interoperable. Because the data is a copy, the original data can not be tampered with outside the enclave. | Another enclave is unable to modify the contents of the data. |
| When an external call returns, replace the data with data modified by the called enclave | Safe, secure and interoperable. | Is not thread-safe. |

FIG . 15A

Enclave-aware
source code
parameters

268

Enclave-aware source code 142

```
public   char notSecret'a';
private char aSecret  'z';
main()
{
    aSubroutine(aSecret);
}
```

FIG . 15B

| Enclave-aware storage class 270 | Description |
|---|---|
| public | Store this data in common memory. |
| private | Store this data in an enclave.  If this data is used in an argument, then pass it to the function via a note. |

FIG . 15C

Enclave
command line
parameters

140

```
$ clang --tx --tx-default-storage=private -o hello hello.c
$
```

FIG . 15D

Enclave source
code parameter

144

Enclave-
specific
parameters

| Scope of each partition | Partitions are managed by... |
| --- | --- |
| Whole systems / Operating systems | Hypervisors 226 |
| Processes 222 | Operating systems 148 |
| Executables 110 | Enclave-aware compiler, enclave-aware loader, and eABI-aware runtime |

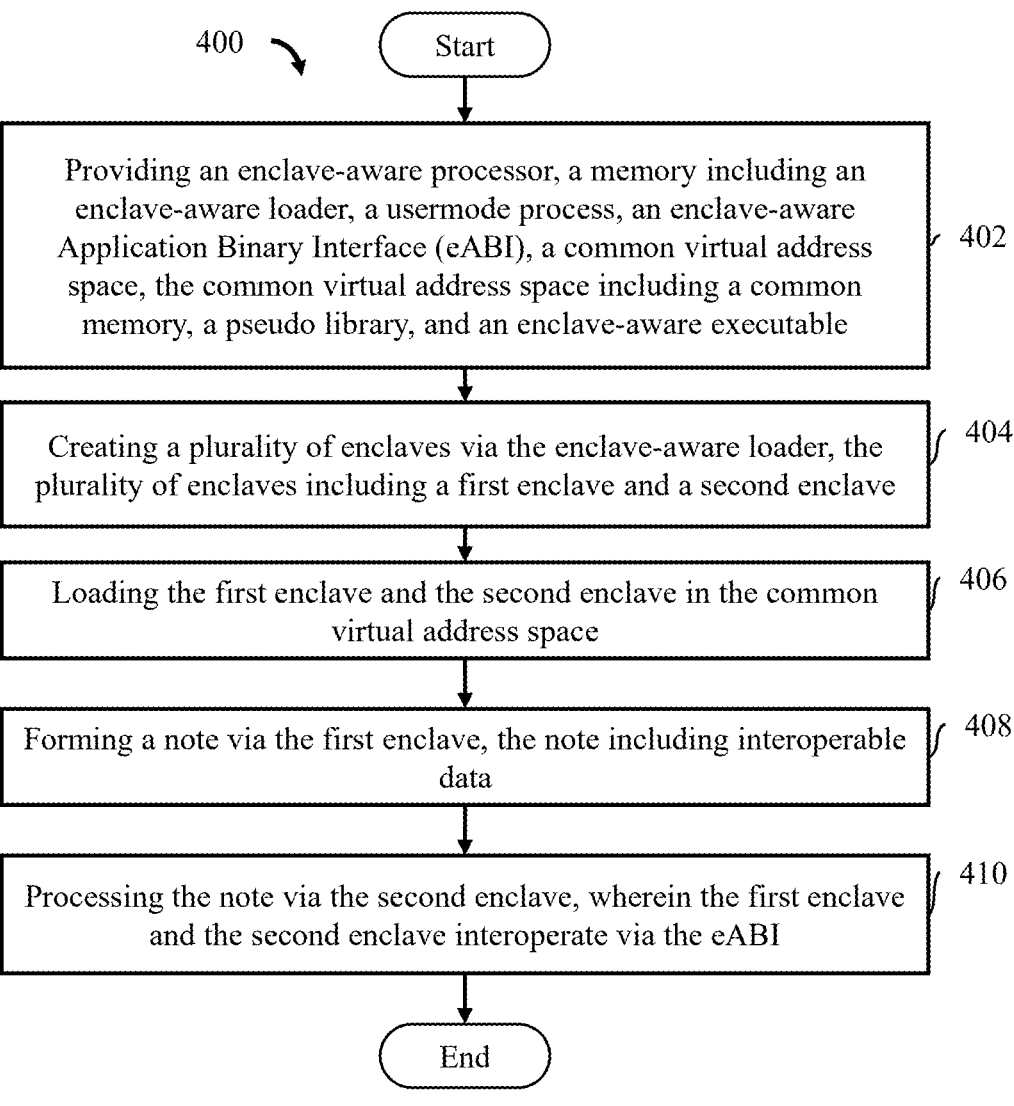

400

Start

Providing an enclave-aware processor, a memory including an enclave-aware loader, a usermode process, an enclave-aware Application Binary Interface (eABI), a common virtual address space, the common virtual address space including a common memory, a pseudo library, and an enclave-aware executable          402

Creating a plurality of enclaves via the enclave-aware loader, the plurality of enclaves including a first enclave and a second enclave          404

Loading the first enclave and the second enclave in the common virtual address space          406

Forming a note via the first enclave, the note including interoperable data          408

Processing the note via the second enclave, wherein the first enclave and the second enclave interoperate via the eABI          410

End

FIG. 20

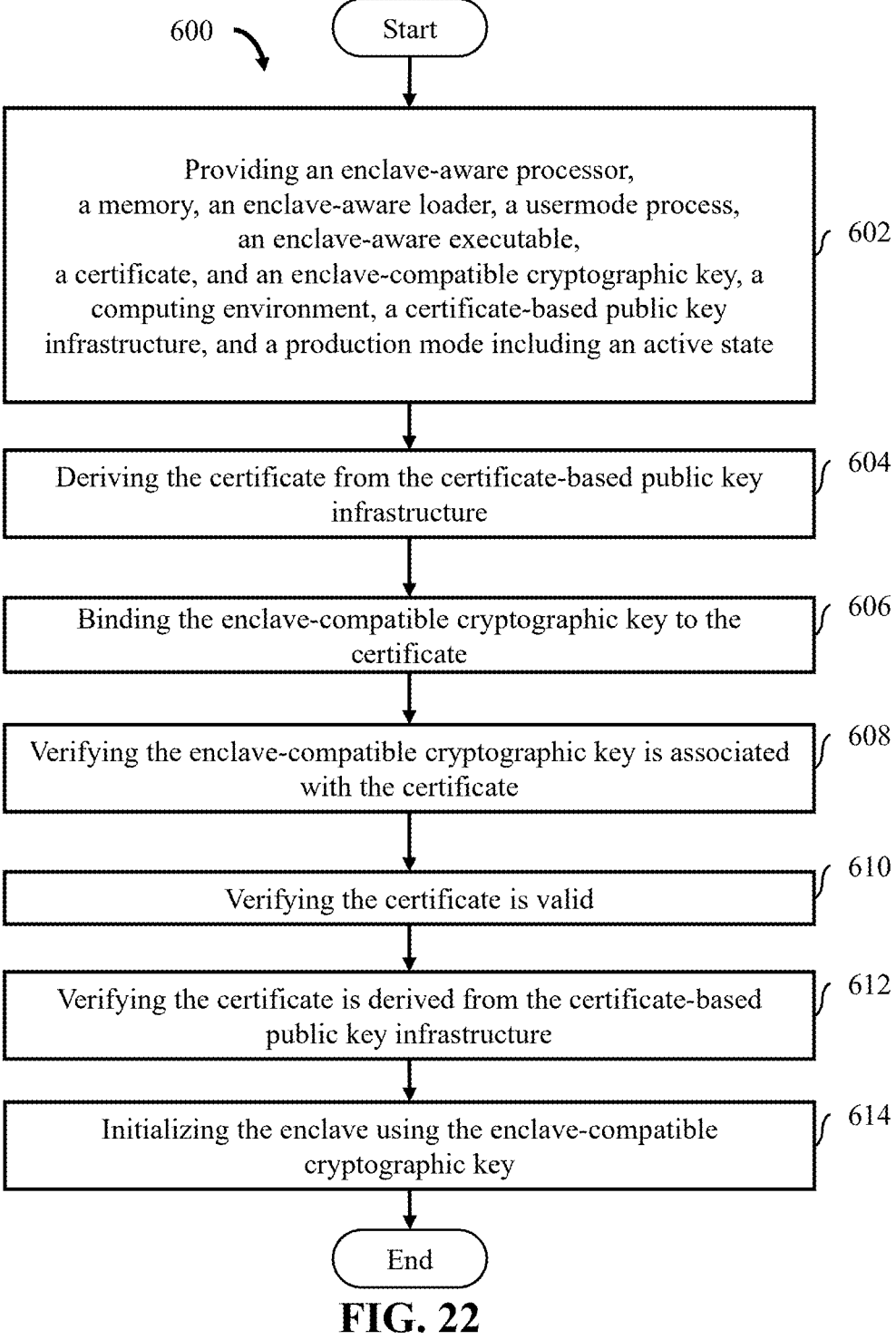

600

Start

Providing an enclave-aware processor,
a memory, an enclave-aware loader, a usermode process,
an enclave-aware executable,
a certificate, and an enclave-compatible cryptographic key, a
computing environment, a certificate-based public key
infrastructure, and a production mode including an active state    602

Deriving the certificate from the certificate-based public key
infrastructure    604

Binding the enclave-compatible cryptographic key to the
certificate    606

Verifying the enclave-compatible cryptographic key is associated
with the certificate    608

Verifying the certificate is valid    610

Verifying the certificate is derived from the certificate-based
public key infrastructure    612

Initializing the enclave using the enclave-compatible
cryptographic key    614

End

FIG. 22

700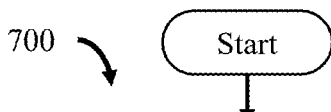

Start

Providing an eABI-aware executable including an eABI-aware main executable, the eABI-aware main executable including an external symbol dependency, an eABI-aware runtime, and an entry/exit bootstrap module

702

Providing a loading sub-process on an eABI-aware executable, the loading sub-process configured to:

(1) analyze the eABI-aware executable, (2) load a portion of an unprotected section of the eABI-aware executable into a common memory when the eABI-aware executable includes the unprotected section, (3) load a portion of a protected section of the eABI-aware executable into an enclave when the eABI-aware executable includes the protected section
*(MAY INCLUDE STEPS IN 24A-24B)*

(4) evaluate the eABI-aware executable for an un-loaded dependent executable including a published symbol, and (5) recursively perform the loading sub-process on the un-loaded dependent executable for each un-loaded dependent executable

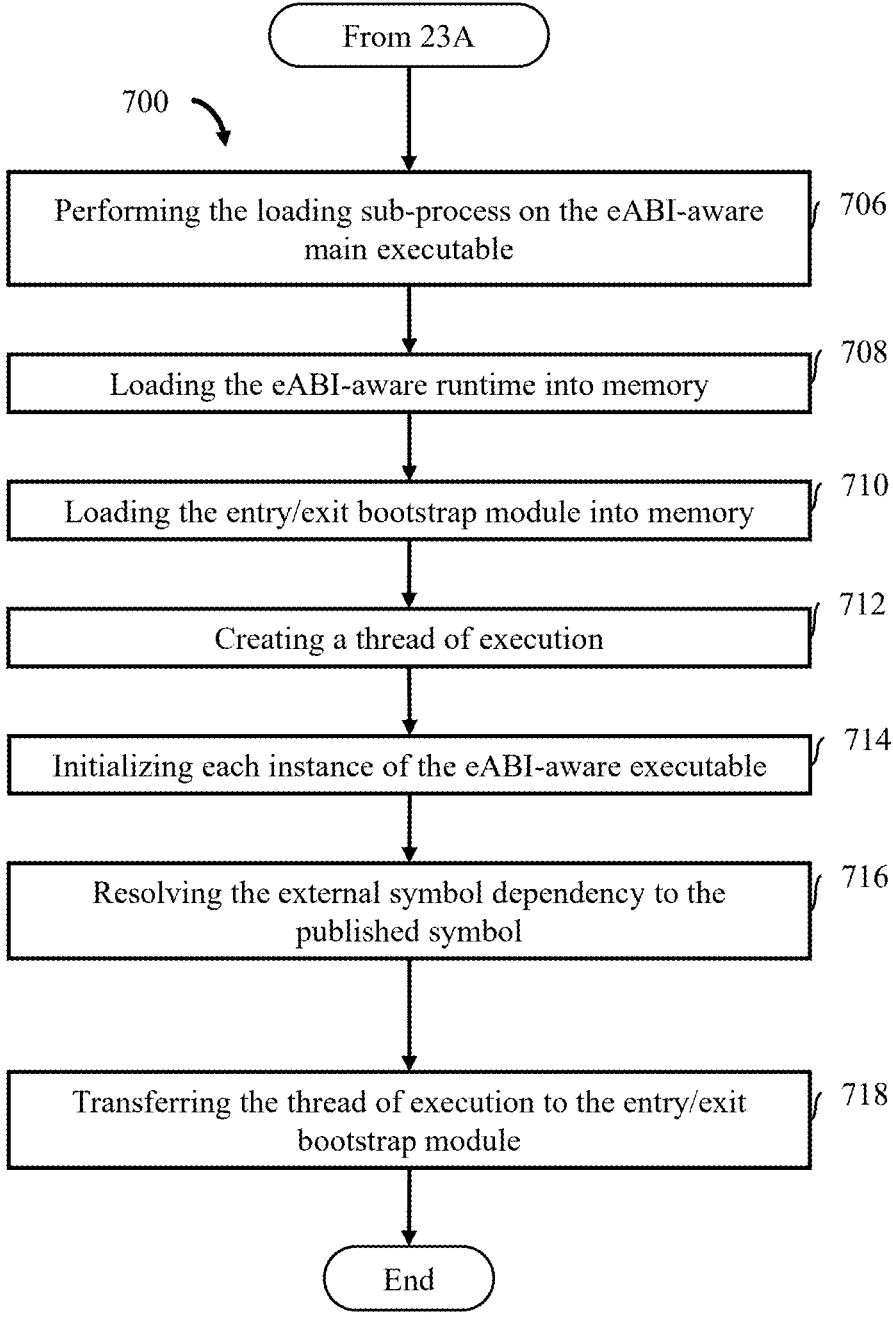

700

From 23A

Performing the loading sub-process on the eABI-aware main executable          706

Loading the eABI-aware runtime into memory          708

Loading the entry/exit bootstrap module into memory          710

Creating a thread of execution          712

Initializing each instance of the eABI-aware executable          714

Resolving the external symbol dependency to the published symbol          716

Transferring the thread of execution to the entry/exit bootstrap module          718

End

FIG. 23B

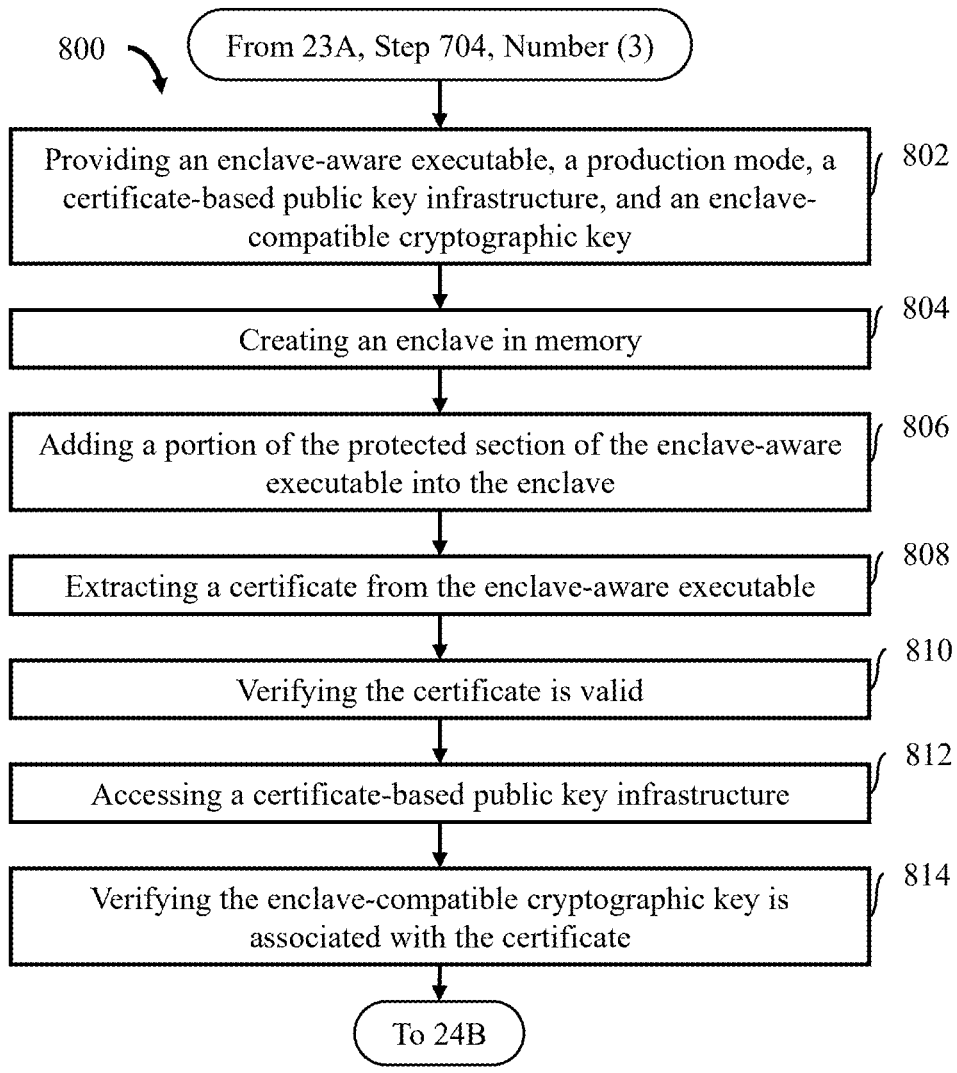

800

From 23A, Step 704, Number (3)

Providing an enclave-aware executable, a production mode, a certificate-based public key infrastructure, and an enclave-compatible cryptographic key — 802

Creating an enclave in memory — 804

Adding a portion of the protected section of the enclave-aware executable into the enclave — 806

Extracting a certificate from the enclave-aware executable — 808

Verifying the certificate is valid — 810

Accessing a certificate-based public key infrastructure — 812

Verifying the enclave-compatible cryptographic key is associated with the certificate — 814

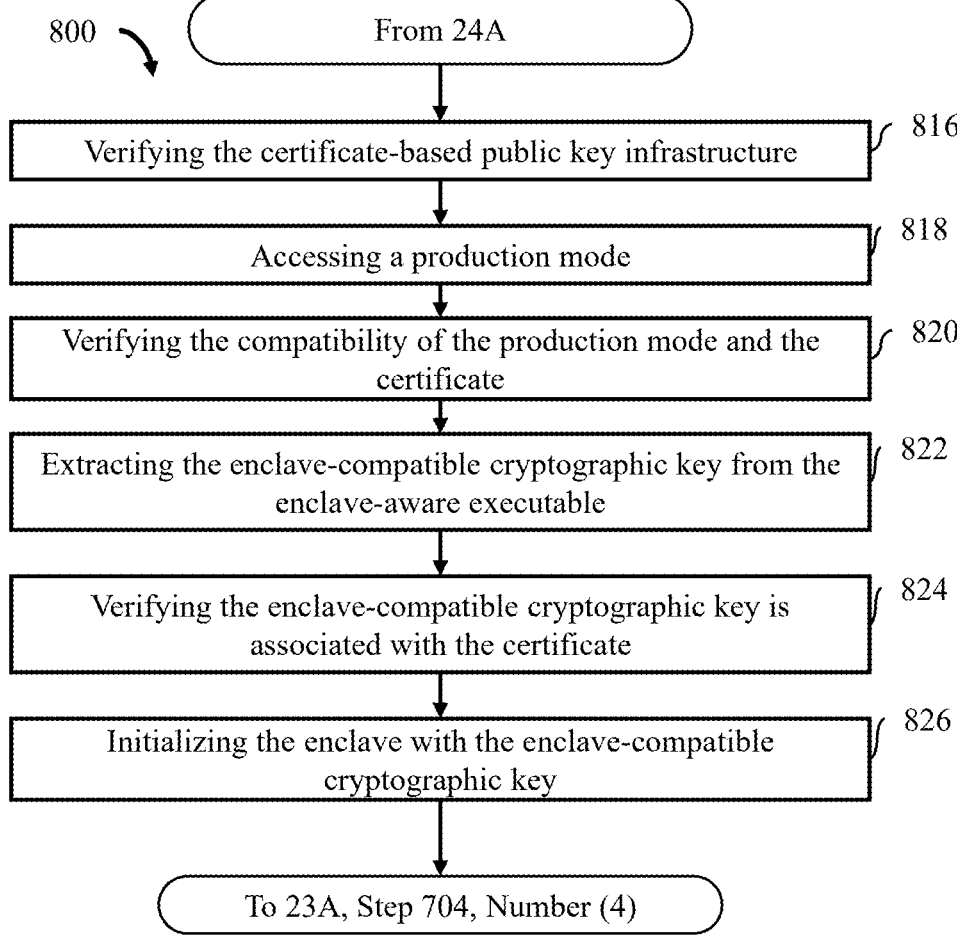

800

From 24A

Verifying the certificate-based public key infrastructure ⟍ 816

Accessing a production mode ⟍ 818

Verifying the compatibility of the production mode and the certificate ⟍ 820

Extracting the enclave-compatible cryptographic key from the enclave-aware executable ⟍ 822

Verifying the enclave-compatible cryptographic key is associated with the certificate ⟍ 824

Initializing the enclave with the enclave-compatible cryptographic key ⟍ 826

To 23A, Step 704, Number (4)

FIG. 24B

SYSTEM AND METHOD FOR LOADING ENCLAVE-AWARE EXECUTABLES

CROSS-REFERENCE TO RELATED APPLICATIONS

This application claims the benefit of U.S. Provisional Application No. 63/565,907, filed on Mar. 15, 2024. The entire disclosure of the above application is incorporated herein by reference.

FIELD

The present technology relates to secure computation, computer security, and data protection within computing environments, and, more particularly, to ways for securely managing partitioned executable code and data within isolated memory regions.

INTRODUCTION

This section provides background information related to the present disclosure which is not necessarily prior art.

Computer programs may represent a substantial investment in development resources, a return on which may be realized only if the programs are believed to be both useful and secure by end-users. Trusted Execution Environments (TEEs) may be used to ensure that programs are utilized in their intended manner by providing confidentiality and integrity guarantees to end-users. Unfortunately, retrofitting support for TEEs after a program has already been completed may be time-consuming and creates substantial risk. Furthermore, it may be nearly impossible to add support for TEEs to a software library developed by an autonomous organization.

TEEs guarantee that code and data are protected with respect to confidentiality and integrity. One technology which provides TEEs is memory enclaves. Enclaves may provide a secure, partitioned container for executing trusted code on a computer that is running less trusted code outside of enclaves. Instructions executing outside an enclave may not access content inside the enclave (FIG. 1). Instructions executing inside an enclave may access data both inside and outside the enclave. One such enclave technology is provided by Intel® and is called Intel® Software Guard Extensions (SGX) enclave technology. Other enclave technologies include AMD® Secure Encrypted Virtualization (SEV) enclave technology, ARM® TrustZone® isolation technology, Apple® Secure Enclave security module, RISC-V® Keystone Enclave open-standard technology, Qualcomm® Secure Execution Environment (QSEE) trusted execution environment, or Huawei® Trusted Execution Environment. Enclaves may be implemented by various means, such as with specialized CPU instructions, memory managers, hypervisors, or dedicated hardware.

An enclave may have rules restricting certain instructions from running inside an enclave that would ordinarily be able to execute outside an enclave. The processor or memory manager may enforce aspects of enclave security, such as memory isolation and restricted instructions. Software attestation may allow one enclave to securely trust another enclave. Enclaves may also have features to securely provide a shared key between two enclaves. A process may have many enclaves.

Enclave systems such as SGX provide security in part by isolating an enclave from other code running in the computer. Enclaves may be digitally signed, but the signature is not tied to a Public Key Infrastructure (PKI) or a certificate. Threads of execution may not execute control flow instructions that transition into or out of an enclave at arbitrary addresses. Instead, threads must pass through designated entry/exit points.

Prior to initialization, the contents of an enclave may be visible by the operating system, however, the enclave-aware processor may not run instructions inside the enclave. During initialization, the enclave may be cryptographically checked to verify its integrity and authenticity, ensuring that it has not been tampered with and conforms to the expected configuration. After initialization, the enclave may securely store and process sensitive information such as cryptographic keys, private data, or proprietary algorithms, while preventing unauthorized access from outside the enclave. After an enclave is provisioned, it may be used by the usermode process.

TEEs are seeing increased use in many security-critical applications. TEEs may be used by applications specifically programmed with an enclave-aware Application Programming Interface (API) or Software Development Kit (SDK) (FIG. 2*a*). This requires substantial development, new tooling and expert knowledge of the SDK. TEEs may also be used in a Library OS framework such as Gramine™ (formerly Graphene) Library Operating System (LibOS) framework where applications may be generally unaware of enclaves, but a large portion of the system may be loaded into an enclave (FIG. 2*b*), thus risking a compromised system from a large, trusted computing base from many different publishers.

Partitioning memory may include system virtualization, process virtualization, or sub-process virtualization. System virtualization may partition entire operating systems running on the same computer. Operating systems may utilize virtual address spaces to partition process workloads for security, safety, and manageability. Sub-process virtualization may partition memory within a process's common virtual address space. TEEs may be a specialized form of sub-process virtualization.

Web browsers rely on certificate-based Public Key Infrastructure (PKI) to verify the authenticity of the URL being accessed. When a user enters a URL in the browser's address bar, the browser verifies that the web server may be legitimately associated with that URL. As part of this process, the web server presents a chain of digital certificates. One certificate in the chain should be trusted by the browser and may establish that the browser trusts every certificate issued by that Certificate Authority (CA). This may be known as a root certificate. Another certificate in the chain may be associated with the URL and issued by the CA. This certificate also contains the web server's public key, the associated domain name, and other identifying information, all of which are cryptographically signed by a CA who affirms the authenticity of the URL. Browsers maintain a list of trusted CA root certificates, ensuring only certificates issued by trusted CAs are considered valid (FIG. 3*a*).

The browser validates the certificate by verifying it was signed by one of the trusted root certificates. Additionally, the browser verifies that the certificate has not expired or been revoked and ensures that the URL in the address bar matches the domain name listed in the certificate. If all these checks pass, the browser completes the connection and displays data for the user. This process may provide the user with assurance that the website is being served by an authorized server and helps protect against attacks such as man-in-the-middle or domain impersonation. While PKIs may be used to trust executables, certificate-based PKIs may not be configured to trust enclaves or enclave-aware executables.

Compilers are essential tools in software development, converting text-based generic source code like C, C++, Go or Rust into processor-executable code (FIG. 4). The processor-executable code and data are placed into sections. At the end of the compilation process, a new executable file may be created by writing out metadata, headers, and the contents of each section, which are then stacked into an executable file (FIG. 7a). This executable file may be copied to other computers and may be run at will by non-programmers. When a user is ready to run the executable file, another program called a "loader" may analyze the executable file, identify dependent "shared libraries" and "runtime" software. The loader may carefully load portions of all these files into a "common virtual address space". Finally, the loader may create a "thread of execution" and may set the CPU's instruction pointer to an entry point in a main executable.

The compiler toolchain for the C language may consist of several stages including preprocessing, compilation, assembly, and linking. On the Linux® open-source operating system, this process may use tools like GCC (GNU Compiler Collection) or Clang® compiler frontend (LLVM® Project), while on Microsoft® Windows® operating system compilation may be performed by Microsoft® Visual C++® compiler toolchain or MinGW® (Minimalist GNU for Windows) compiler and runtime environment. Compilation may include multiple stages, including lexical analysis, syntax analysis, semantic analysis, optimization, and code generation.

Compilers may generate executable files directly for a target platform or produce intermediate object files that are later linked together to create the final executable. Compilers may include options for targeting alternate hardware architectures or alternate Application Binary Interfaces (ABIs). A significant amount of time may elapse between the time an executable is compiled and when it is run.

The ABI defines the low-level interface between software components, such as between a compiled program and the operating system or between different modules of a program. Unlike an API, which specifies how source code components interact, an ABI governs how binary code interoperates, including details like function calling conventions, data type layouts, register usage, how external symbols are accessed, and system call mechanisms (FIG. 4). These standards are architecture specific. ABIs ensure compatibility between compiled code and the underlying runtime environment, allowing software to run correctly on a given platform. For example, in the context of a C executable, the ABI may specify how function arguments are passed (e.g., in registers or on the stack), how return values are handled, and how memory alignment is maintained. Standardized ABIs, such as the System V AMD64 ABI for Linux® open-source operating system or the Microsoft® x64 Calling Convention for Windows® operating system, play a role in enabling interoperability between different compilers, libraries, and operating systems. Compilers may generate executables that must conform to these interoperability standards. By adhering to these standards, developers and toolchain providers ensure that software may execute reliably across diverse environments. However, ABIs may expect all executables to be in common memory. Therefore, ABIs may not be aware of enclaves.

Each section within an executable may be identified from an entry in a section table. The section table may include a name, start location, size, flags, and attributes. Some sections are informational only and do not need to be loaded into memory, for example a section called ".note" that contains information about the compiler toolchain. Sections are unprotected. Data sections may have names like ".data", ".bss", ".rdata", ".idata", ".tls", or ".got" and do not include processor instructions. Text sections, however, may include processor instructions or data and may be named ".text", ".code", ".init", or ".fini".

After an executable is compiled, it may use program loaders and the runtime environment to execute (FIG. 4). The program loader may be responsible for loading the executable into memory, recursively resolving shared library dependencies, and setting up the initial execution environment, including stack, heap, and program arguments. In Linux® open-source operating system, the loader may be the dynamic linker/loader (ld.so), which may be invoked by the kernel. On Microsoft® Windows® operating system, the loader may be a component of the Windows® Application Programming Interface (API).

The runtime environment provides essential services such as dynamic memory allocation, standard I/O handling, and signal processing, often implemented by libraries like glibc on Linux® open-source operating system or the Microsoft® C Runtime Library (msvcrt.dll) dynamic link runtime library on Microsoft® Windows® operating system. This cohesive ecosystem ensures that a compiled executable may reliably run across many different systems.

The process of compiling, loading, and operating enclaves may limit an end-user's ability to maintain security protections across the computing environment due to lack of tools such as compilers, loaders, and runtimes that support enclaves. The reliance on outdated process isolation methods and the inability of systems to support sub-process isolation with generic source code leaves code and data susceptible to breaches, especially when supervisory systems like operating systems or hypervisors are compromised. Furthermore, the inability to verify the trustworthiness of third-party libraries has compounded these security risks, making it difficult to ensure the integrity and confidentiality of data. A broad adoption of TEEs requires a reevaluation of the relationship between executables and libraries, along with a redefined ABI that supports stricter security protocols. Making TEEs ubiquitous would significantly mitigate these issues.

There is a continuing need for enhanced security methods and systems in the management of process memory spaces within computing environments. Desirably, these methods and systems would address the vulnerabilities inherent in the traditional models where executables share a common virtual address space, exposing sensitive data to potential unauthorized access and manipulation.

SUMMARY

In concordance with the instant disclosure, an enhanced security method and system in the management of process memory spaces within computing environments, which addresses the vulnerabilities inherent in the traditional models where executables share a common virtual address space, exposing sensitive data to potential unauthorized access and manipulation, has surprisingly been discovered.

The present technology improves the security and integrity of computing systems by enabling the automation of isolating of executable code within secure enclaves and facilitating encrypted communication between these enclaves, thereby reducing the risk of unauthorized access and data breaches. Structuring the computing system in this manner not only respects user privacy but also enhances the overall security and resilience of systems against both internal and external threats.

In certain embodiments, a system for enhancing security in a computing environment that supports an enclave is provided. The system may include an enclave-aware processor. The system may include a memory in communication with the enclave-aware processor. The memory may include an enclave-aware loader. The memory may also include a usermode process. The memory may also include an enclave-aware executable. The enclave-aware loader may be configured to analyze the enclave-aware executable. The enclave-aware loader may create an instance of an enclave in the memory. The enclave-aware loader may provision the usermode process to interoperate with the enclave. The enclave-aware loader may add a portion of the enclave-aware executable into the enclave. The enclave-aware loader may also initialize the enclave. Once initiated, the enclave may be configured to interoperate with the usermode process.

In certain embodiments, the enclave-aware executable may include a section. The section may include a protected text section, an unprotected text section, a protected data section, an unprotected data section, or combinations thereof. The enclave-aware loader may be configured to load a portion of a protected text section into the enclave when the enclave-aware executable includes the protected text section. The enclave-aware loader may also be configured to load a portion of a protected data section into the enclave when the enclave-aware executable includes the protected data section. The enclave-aware loader may also be configured to load a portion of an unprotected text section into common memory when the enclave-aware executable includes the unprotected text section. The enclave-aware loader may also be configured to load a portion of an unprotected data section into common memory when the enclave-aware executable includes the unprotected data section.

In certain embodiments, the system may also include generic source code. The memory may include an enclave-aware compiler. The enclave-aware compiler may translate a portion of the generic source code into the enclave-aware executable. The enclave-aware executable may include enclave-aware instructions that interoperate with an enclave. The enclave-aware executable may also include processor instructions that interoperate between the enclave and the usermode process via an enclave-aware Application Binary Interface (eABI). The enclave-aware processor may be configured to execute the processor instructions and the enclave-aware instructions. This allows the usermode process to interoperate with the enclave via the eABI-aware runtime.

In certain embodiments, the system may include a common virtual address space. The enclave-aware executable may be configured to run within the common virtual address space. The common virtual address space may include a common memory. The common virtual address space may also include a pseudo library. The enclave-aware loader may be configured to analyze the pseudo library. The enclave-aware loader may create an instance of a pseudo enclave in the common memory. The enclave-aware loader may add a portion of the pseudo library into the pseudo enclave. The enclave-aware loader may initialize the pseudo enclave. The pseudo enclave may also be configured to interoperate with the usermode process via the eABI.

In certain embodiments, the system may also include an eABI-aware runtime. The enclave-aware loader is further configured to load the eABI-aware runtime into memory. The enclave-aware loader is further configured to initialize the eABI-aware runtime, where the eABI-aware runtime may then interoperate with the enclave. The system may also include an eABI-aware library. The eABI-aware library may include a published symbol. The system may also include an eABI-aware executable. The eABI-aware executable may include an external symbol dependency. The enclave-aware loader may resolve the external symbol dependency to the published symbol. The external symbol dependency may be configured to access the published symbol. For example, an external symbol dependency may include records or data in a table for referencing the published symbol.

In certain embodiments, the system may also include a data security mode. The data security mode may include a plaintext mode, an encryption mode, a validation mode, an encryption with validation mode, or combinations thereof. The system may also include a certificate. The system may further include an enclave-compatible cryptographic key associated with the certificate. The enclave-aware loader may be configured to verify the enclave is initialized with the enclave-compatible cryptographic key associated with the certificate. The system may also include a certificate-based public key infrastructure. The system may also include a production mode, which may have an active state. The system's computing environment may be configured to trust every certificate via the certificate-based public key infrastructure when the production mode is in the active state.

In certain embodiments, a method for enhancing security in a computing environment that supports an enclave is provided. The method may include a step of providing an enclave-aware processor, a memory including a common virtual address space, a usermode process, and an enclave-aware executable, an enclave-aware loader, and an enclave-aware Application Binary Interface (eABI). The enclave-aware loader may be configured to analyze the enclave-aware executable, create an instance of an enclave in the memory, provision the usermode process to interoperate with the enclave, add a portion of the enclave-aware executable into the enclave, and initialize the enclave. Once initiated, the enclave may interoperate with the usermode process. The enclave-aware executable may run within the common virtual address space. The common virtual address space may include a common memory. The common virtual address space may also include a pseudo library. The enclave-aware loader may be configured to analyze the pseudo library. The enclave-aware loader may create an instance of a pseudo enclave in the common memory. The enclave-aware loader may add a portion of the pseudo library into the pseudo enclave. The enclave-aware loader may initialize the pseudo enclave. The pseudo enclave may also interoperate with the usermode process via the eABI. The method may include a step of creating a plurality of enclaves via the enclave-aware loader where the plurality of enclaves includes a first enclave and a second enclave. The method may include a step of loading the first enclave and the second enclave in the common virtual address space. The method may then include a step of forming a note via the first enclave. The note may include interoperable data. The method may include a step of processing the note via the second enclave, allowing the first enclave and the second enclave interoperate via the eABI.

In certain embodiments, a method for enhancing security in a computing environment that supports an enclave is provided. The method may include a step of providing an enclave-aware processor, a memory including a common virtual address space, a usermode process, and an enclave-aware executable, an enclave-aware loader, and an enclave-aware Application Binary Interface (eABI). The enclave-aware loader may be configured to analyze the enclave-aware executable, create an instance of an enclave in the memory, provision the usermode process to interoperate with the enclave, add a portion of the enclave-aware executable into the enclave, and initialize the enclave. Once initiated, the enclave may interoperate with the usermode process. The enclave-aware executable may run within the common virtual address space. The common virtual address space may include a common memory. The common virtual address space may also include a pseudo library. The enclave-aware loader may be configured to analyze the pseudo library. The enclave-aware loader may create an instance of a pseudo enclave in the common memory. The enclave-aware loader may add a portion of the pseudo library into the pseudo enclave. The enclave-aware loader may initialize the pseudo enclave. The pseudo enclave may also interoperate with the usermode process via the eABI. The method may include a step of creating a plurality of enclaves via the enclave-aware loader where the plurality of enclaves includes a first enclave and a second enclave. The method may include a step of loading the first enclave and the second enclave in the common virtual address space. The method may then include a step of forming a note via the first enclave. The note may include interoperable data. The method may include a step of processing the note via the second enclave, allowing the first enclave and the second enclave interoperate via the eABI. The method may then include a step of providing an eABI-aware runtime. The method may include a step of relaying the note from the first enclave to the eABI-aware runtime. The method may include a step of dispatching the note from the eABI-aware runtime to the second enclave.

In certain embodiments, a method for enhancing security in a computing environment that supports an enclave is provided. The method may include a step of providing an enclave-aware processor, a memory in communication with the enclave-aware processor, an enclave-aware loader, a usermode process, an enclave-aware executable, a certificate, an enclave-compatible cryptographic key associated with the certificate, a certificate-based public key infrastructure, and a production mode. The production mode may include an active state. The enclave-aware loader may be configured to analyze the enclave-aware executable. The enclave-aware loader may be configured to create an instance of an enclave in the memory. The enclave-aware loader may be configured to provision the usermode process to interoperate with the enclave. The enclave-aware loader may be configured to add a portion of the enclave-aware executable into the enclave. The enclave-aware loader may also initialize the enclave. Once initiated, the enclave may be configured to interoperate with the usermode process. The enclave-aware loader may be configured to verify the enclave is initialized with the enclave-compatible cryptographic key associated with the certificate. The system's computing environment may be configured to trust every certificate via the certificate-based public key infrastructure when the production mode is in the active state. The method may include a step of deriving the certificate from the certificate-based public key infrastructure. The method may then include a step of binding the enclave-compatible cryptographic key to the certificate. The method may include a step of verifying the enclave-compatible cryptographic key is associated with the certificate. The method may include a step of verifying the certificate is valid. The method may include a step of verifying the certificate is derived from the certificate-based public key infrastructure. The amount of time that passes between when a certificate is derived and when a certificate is verified may vary, including extensive delays. The method may include a step of initializing the enclave using the enclave-compatible cryptographic key.

In certain embodiments, a method for enhancing security in a computing environment that supports an enclave is provided. The method may include a step of providing an eABI-aware executable including an eABI-aware main executable, the eABI-aware main executable including an external symbol dependency, an eABI-aware runtime, and an entry/exit bootstrap module. The method may include a step of providing a loading sub-process on an eABI-aware executable. The loading sub-process may be configured to analyze the eABI-aware executable. The loading sub-process may also be configured to load a portion of an unprotected section of the eABI-aware executable into a common memory when the eABI-aware executable includes the unprotected section. The loading sub-process may be configured to load a portion of a protected section of the eABI-aware executable into an enclave when the eABI-aware executable includes the protected section. The loading sub-process may be configured to evaluate the eABI-aware executable for an un-loaded dependent executable including a published symbol. The loading sub-process may be configured to then recursively perform the loading sub-process on the un-loaded dependent executable for each un-loaded dependent executable. The method may include a step of performing the loading sub-process on the eABI-aware main executable. The method may include a step of loading the eABI-aware runtime into memory. The method may include a step of loading the entry/exit bootstrap module into memory. The method may then include a step of creating a thread of execution. The method may include a step of initializing each instance of the eABI-aware executable. The method may also include a step of resolving the external symbol dependency to the published symbol. The method may include a step of transferring the thread of execution to the entry/exit bootstrap module.

In certain embodiments, when the loading sub-process loads a portion of a protected section of the eABI-aware executable into an enclave when the eABI-aware executable includes the protected section, the method may include a step of providing an enclave-aware executable, a production mode, a certificate-based public key infrastructure, and an enclave-compatible cryptographic key. The method may then include a step of creating an enclave in memory. The method may include a step of adding a portion of the protected section of the enclave-aware executable into the enclave. The method may then include a step of extracting a certificate from the enclave-aware executable. The method may include a step of verifying the certificate is valid. The method may include a step of accessing a certificate-based public key infrastructure. The method may include a step of verifying the enclave-compatible cryptographic key is associated with the certificate. The method may also include a step of verifying the certificate-based public key infrastructure. The method may include a step of accessing a production mode. The method may include a step of verifying the compatibility of the production mode and the certificate. The method may include a step of extracting the enclave-compatible cryptographic key from the enclave-aware executable. The method may include a step of verifying the enclave-compatible cryptographic key is associated with the certificate. The method may include a step of initializing the enclave with the enclave-compatible cryptographic key.

In certain embodiments, the system may include a non-transitory computer-readable medium. The non-transitory computer-readable medium may store enclave-aware instructions. When executed by an enclave-aware processor, the enclave-aware instruction may cause the enclave-aware processor to analyze an enclave-aware executable. The enclave-aware processor may also create an instance of an enclave inside a usermode process. The enclave-aware processor may then load portions of the enclave-aware executable into the enclave. The enclave-aware processor may initialize the enclave, allowing the enclave to interoperate with the usermode process.

Advantageously, the present technology provides an enhanced security computing environments by automating the process of loading executables into enclaves with an integrated enclave-aware loader, the technology streamlines the enclave creation process and mitigates the risks of unauthorized data access and manipulation by external processes or malicious entities. This innovative approach not only fortifies the security landscape of digital systems but also provides a scalable and efficient framework for automating secure computing for users of all levels of computer proficiency, thereby addressing the critical needs for privacy and data protection in modern computing environments.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

FIG. 1 is a prior art table describing the level of access for data, instructions and restricted instructions inside and outside of an enclave;

FIG. 2A is a prior art schematic diagram illustrating how enclaves are enabled using a Software Development Kit (SDK);

FIG. 2B is a prior art schematic diagram illustrating a Library OS implementation of an enclave;

FIG. 7A is a prior art schematic diagram illustrating how an executable is comprised of a header, section table and a set of sections.

FIG. 7B is a schematic diagram illustrating an enclave-aware executable, according to another embodiment of the present disclosure;

FIG. 12 is a schematic diagram illustrating various types of compilers, according to another embodiment of the present disclosure;

FIG. 13A is a table that relates a desired safety or security outcome to a set of data security modes, according to another embodiment of the present disclosure;

FIG. 13B is a table that relates to a desired level of security, according to another embodiment of the present disclosure;

FIG. 14 is a schematic diagram illustrating various types of sections, according to another embodiment of the present disclosure;

FIG. 15A is a table illustrating storing data in various types of memory, according to another embodiment of the present disclosure;

FIG. 15B is sample source code illustrating two enclave-aware source code parameters, according to another embodiment of the present disclosure;

FIG. 15C is a table illustrating two enclave-aware storage classes, according to another embodiment of the present disclosure;

FIG. 15D is a sample console session illustrating how two enclave command line parameters may be passed to the Clang® compiler, according to another embodiment of the present disclosure;

FIG. 15E is a schematic diagram illustrating enclave-aware source code parameters and command line parameters, according to another embodiment of the present disclosure;

FIG. 20 is a flowchart illustrating a method for enhancing security in a computing environment, according to another embodiment of the present disclosure;

FIG. 22 is a flowchart illustrating a method for enhancing security in a computing environment, according to another embodiment of the present disclosure;

Figure 3A:
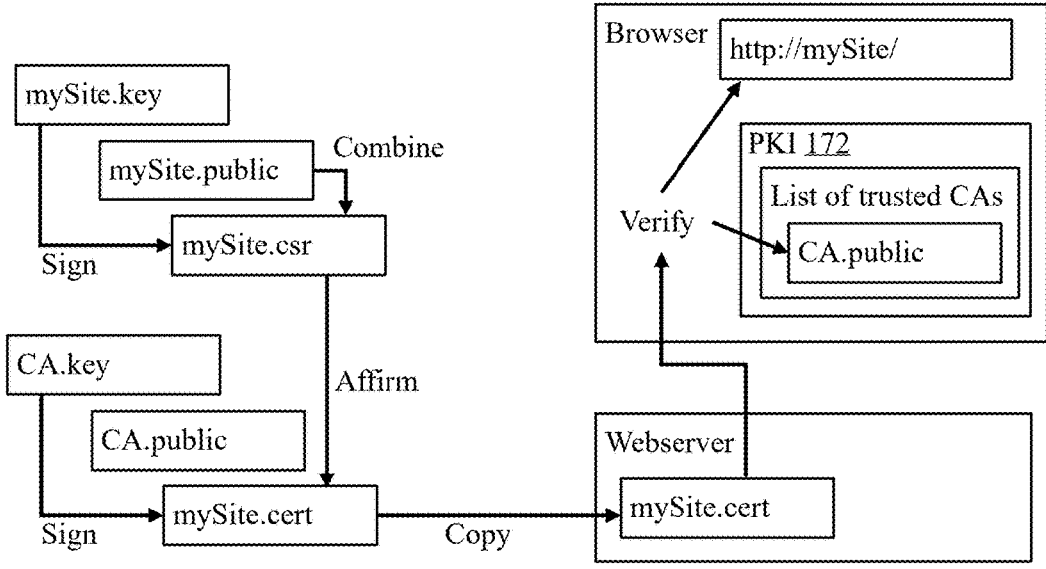
FIG. 3A is a prior art schematic diagram illustrating how Public Key Cryptography (PKI) is used to verify URLs in a web browser.

FIGS. 23A & 23B provide a flowchart illustrating a method for enhancing security in a computing environment, according to another embodiment of the present disclosure; and FIGS. 24A & 24B provide a flowchart illustrating a method for enhancing security in a computing environment, according to another embodiment of the present disclosure.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of a steps presented is exemplary in nature, and thus, the order of a steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 21:
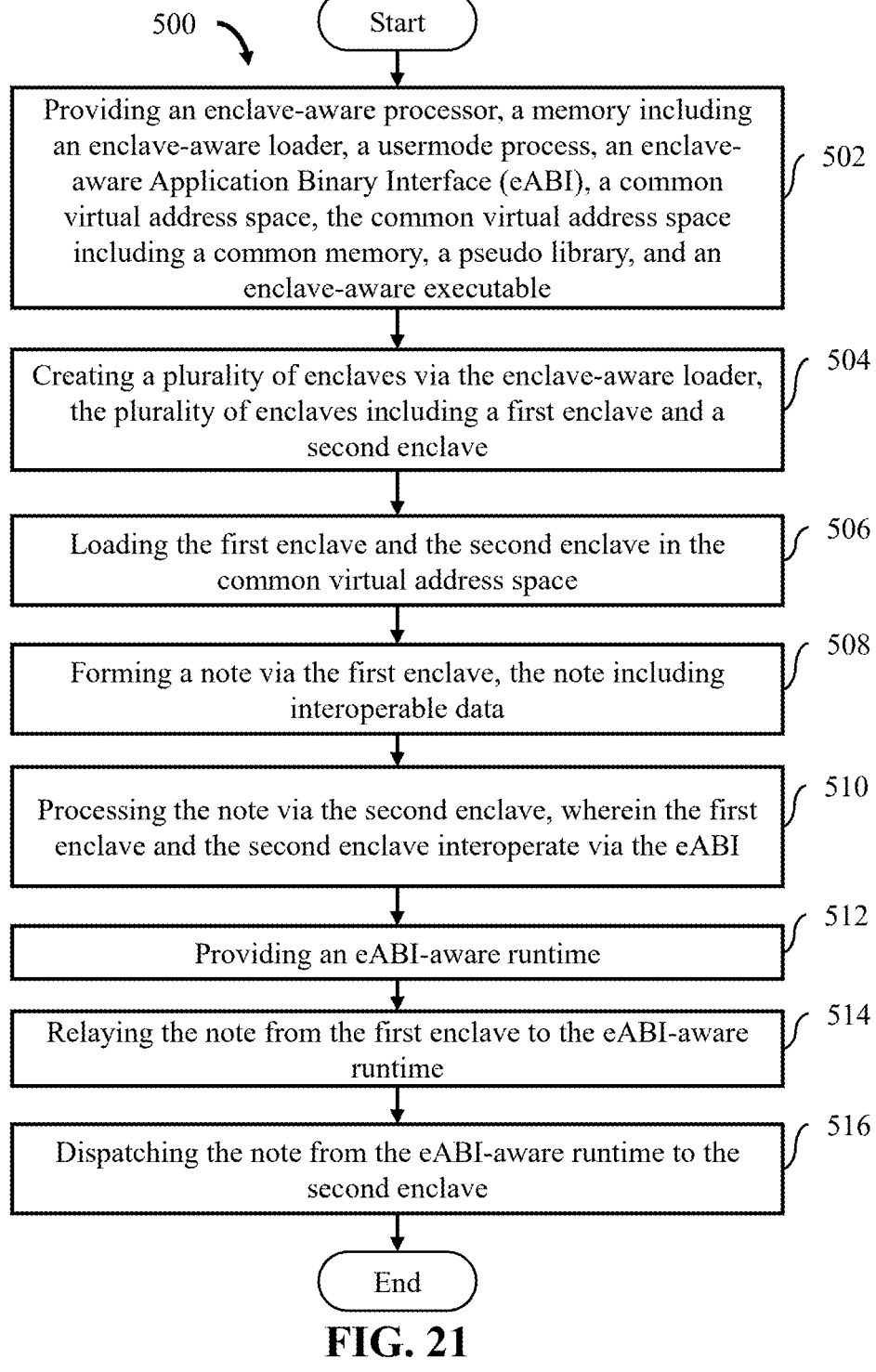
FIG. 21 is a flowchart illustrating a method for enhancing security in a computing environment, according to another embodiment of the present disclosure.

The present technology improves the safety, security, and integrity of computing systems by automating the isolation of executable code within secure enclaves 104 and facilitating encrypted communication between these enclaves 104, thereby reducing the risk of unauthorized access and data 216 breaches, aspects of which are shown in FIGS. 3B and 7B through 19. A method for enhancing security in a computing environment 102 that supports an enclave 104 is also disclosed, aspects of which are shown in FIG. 20. Another method for enhancing security in a computing environment 102 that supports an enclave 104 is also disclosed, aspects of which are shown in FIG. 21. And yet another method for enhancing security in a computing environment 102 that supports an enclave 104 is provided in FIG. 22. In FIGS. 23A and 23B, a method for enhancing security in a computing environment 102 that supports an enclave 104 is provided. In FIGS. 24A and 24B, a method for enhancing security in a computing environment 102 that supports an enclave 104, showing steps within a loading sub-process is provided.

As shown in FIGS. 3B and 7B through 19, certain aspects of a system 100 for enhancing security in a computing environment 102 that supports an enclave 104 are illustrated. The system 100 may include an enclave-aware processor 124. The system 100 may include a memory 108 in communication with the enclave-aware processor 124. The memory 108 may include an enclave-aware loader 146. The memory 108 may also include a usermode process 150. The memory 108 may also include an enclave-aware executable 126. The enclave-aware loader 146 may be configured to analyze the enclave-aware executable 126. The enclave-aware loader 146 may create an instance of an enclave 104 in the memory 108. The enclave-aware loader 146 may provision the usermode process 150 to interoperate with the enclave 104. The enclave-aware loader 146 may add a portion of the enclave-aware executable 126 into the enclave 104. The enclave-aware loader 146 may also initialize the enclave 104. Once initiated, the enclave 104 may be configured to interoperate with the usermode process 150.

The enclave-aware executable 126 may include a section 152. The section 152 may include an unprotected section 154. The section 152 may also include a protection section 156. The protected section 156 may include a protected text section 158 and a protected data section 160. The unprotected section 154 may include an unprotected text section 162 and an unprotected data section 164. The section 152 may also include a combination of the protected text section 158, the protected text section 158, the unprotected data section 164, and the unprotected text section 162. The enclave-aware loader 146 may be configured to load a portion of the protected text section 158 into the enclave 104 when the enclave-aware executable 126 includes the protected text section 158. The enclave-aware loader 146 may also be configured to load a portion of the protected data section 160 into the enclave 104 when the enclave-aware executable 126 includes the protected data section 160. The enclave-aware loader 146 may also be configured to load a portion of the unprotected text section 162 into a common memory 166 when the enclave-aware executable 126 includes the unprotected text section 162. The enclave-aware loader 146 may also be configured to load a portion of the unprotected data section 164 into common memory 166 when the enclave-aware executable 126 includes the unprotected data section 164. It should be appreciated that the unprotected section 154 may further include a section 152 that is not intended to be loaded by the enclave-aware loader 146.

The system may also include generic source code 118. The memory 108 may include an enclave-aware compiler 122. The enclave-aware compiler 122 may translate a portion of the generic source code 118 into the enclave-aware executable 126. The enclave-aware executable 126 may include enclave-aware instructions 128 that interoperate with an enclave 104. The enclave-aware executable 126 may also include processor instructions 120 that interoperate between the enclave 104 and the usermode process 150 via an enclave-aware Application Binary Interface (eABI) 114. The enclave-aware processor 124 may be configured to execute the processor instructions 120 and the enclave-aware instructions 128. This allows the usermode process 150 to interoperate with the enclave 104 via the eABI-aware runtime 180.

The system 100 may also include the eABI 114. The system 100 may include a common virtual address space 220. The enclave-aware executable 126 may be configured to run within the common virtual address space 220. The common virtual address space 220 may include a common memory 116. The common virtual address space 220 may also include a pseudo library 208. The enclave-aware loader 146 may be configured to analyze the pseudo library 208. The enclave-aware loader 146 may create an instance of a pseudo enclave 210 in the common memory 166. The enclave-aware loader 146 may add a portion of the pseudo library 208 into the pseudo enclave 210. Next, the enclave-aware loader 146 may initialize the pseudo enclave 210. The pseudo enclave 210 may also be configured to interoperate with the usermode process 150 via the eABI 114.

The system 100 may also include an eABI-aware runtime 180. The enclave-aware loader 146 is further configured to load the eABI-aware runtime 180 into memory 108. The enclave-aware loader 146 is further configured to initialize the eABI-aware runtime 180, where the eABI-aware runtime 180 may then interoperate with the enclave 104. The system 100 may also include an eABI-aware library 186. The eABI-aware library 186 may include a published symbol 194. The system 100 may also include an eABI-aware executable 112. The eABI-aware executable 112 may include an external symbol dependency 184. The enclave-aware loader 146 may resolve the external symbol dependency 184 to the published symbol 194. The external symbol dependency 184 may be configured to access the published symbol 194.

The system 100 may also include a data security mode 130. The data security mode 130 may include a plaintext mode 132, an encryption mode 134, a validation mode 136, an encryption with validation mode 138, or combinations thereof.

Figure 3B:
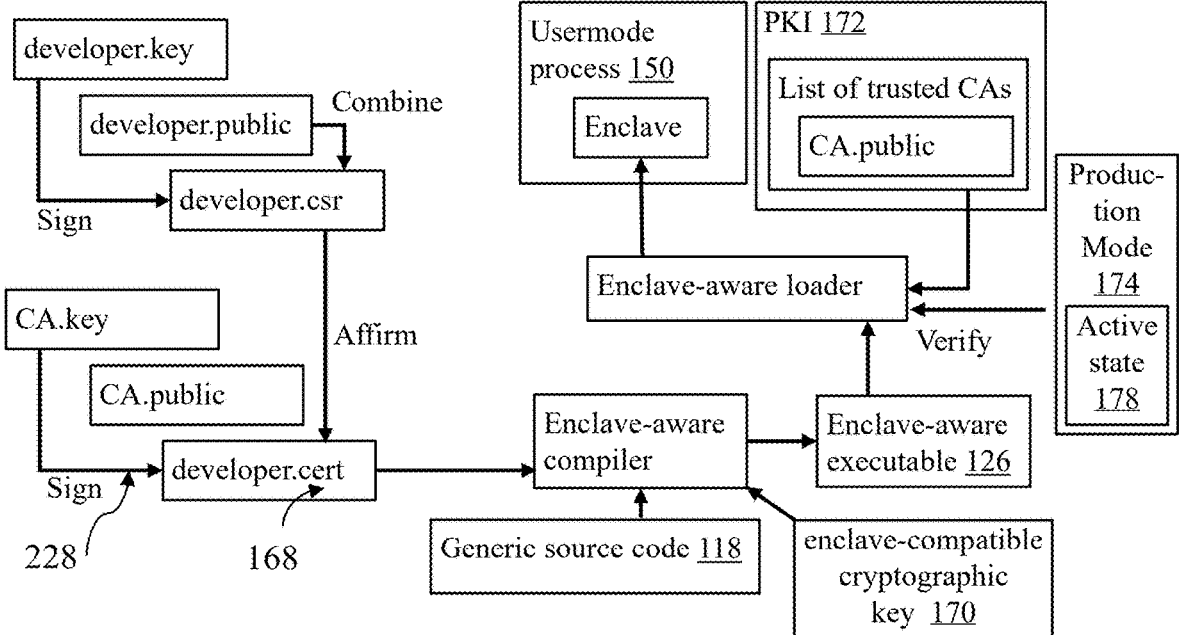
FIG. 3B is a schematic diagram illustrating how PKI may be used to determine the trustworthiness of an enclave-aware executable, according to an embodiment of the present disclosure.

The system 100 may also include a certificate 168, as shown in FIG. 3B. The system 100 may further include an enclave-compatible cryptographic key 170 associated with the certificate 168. The enclave-aware loader 146 may be configured to verify the enclave 104 is initialized with the enclave-compatible cryptographic key 170 associated with the certificate 168.

The system 100 may also include a certificate-based public key infrastructure (PKI) 172. The system 100 may also include a production mode 174, which may have an active state 178. The system's 100 computing environment 102 may be configured to trust every certificate 168 via the PKI 172 when the production mode 174 is in the active state 178.

The memory 108 may have the following aspects. The memory 108 may include data and processor instructions 120. Memory 108 may be partitioned in various ways depending on the desired functionality. It should be appreciated that partitioning memory 108 may improve the safety and security of data 216 and instructions 218 stored in each enclave 104. A memory 108 may include a single memory 108 or multi-memory 108 unit.

Figure 10:
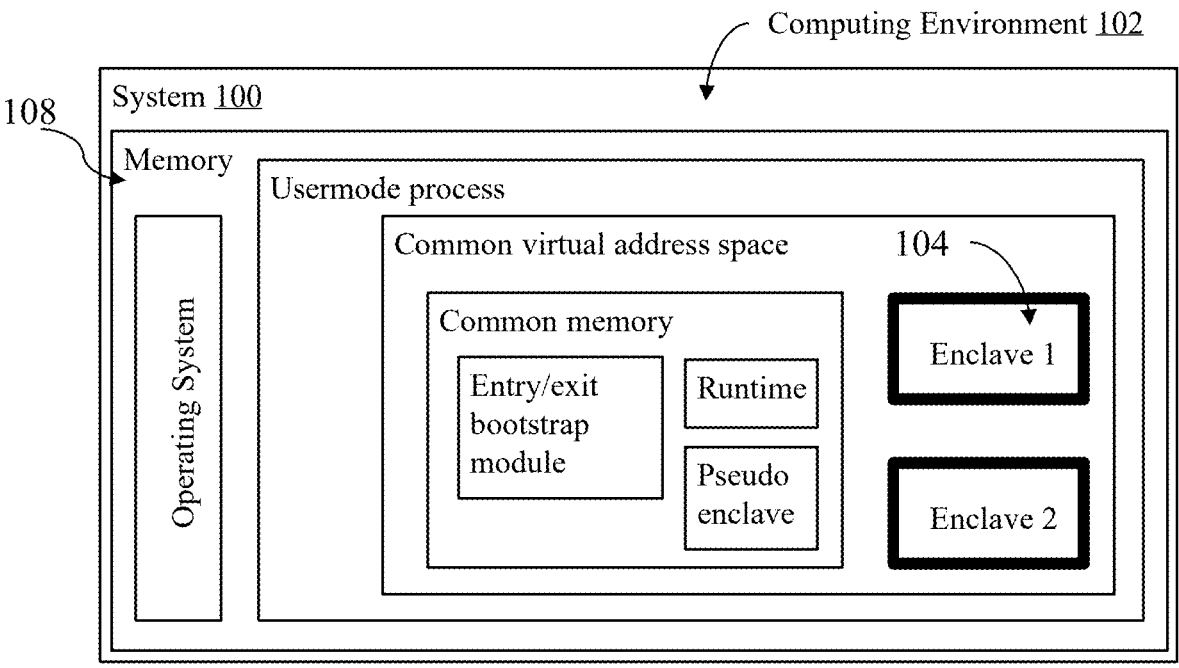
FIG. 10 is a schematic diagram illustrating various types of memory, according to another embodiment of the present disclosure.

The memory 108 may include a common virtual address space 220. The common virtual address space 220 may be mapped from memory 108. Each process 222 may have one common virtual address space 220 and maybe the set of valid memory 108 addresses for that process. The common virtual address space 220 may include one common memory 166 and zero or more enclaves 104 that are needed by the process 222 (FIG. 10). Common memory 166 may be in the common virtual address space 220 and may have the following aspects. Common memory 166 may include memory 108 that does not contain an enclave 104 (FIG. 10). The common memory 166 may include sections 152 mapped from unprotected text sections 162 and unprotected data sections 164 of executables 110 (FIG. 7A). The common memory 166 may also include a pseudo enclave 210. However, the common memory 166 will not include protected text sections 158, or protected data sections 160. Data 216 and instructions 218 in common memory 166 may be mapped into memory 108 from unprotected sections 154 of an executable 110. Data 216 and instructions 218 in common memory 166 may be accessible from any thread of execution 224 in the process 222, with no protections for data 216 and instructions 218 in common memory 166 from the process 222. It should be appreciated that, if any anything in the common memory 166 has an exploitable vulnerability, then everything within the common memory 166 may be compromised with respect to confidentiality or integrity. Furthermore, if the operating system 148 or hypervisor 226 is compromised, then all of the resources including the processes and common memory 166 under them, may also be compromised. It should also be appreciated that common memory 166 may not be initialized in the same way as an enclave 104. Enclaves 104 may contain digital signatures 228 to ensure they have not been altered whereas common memory 166 has no such protections. Common memory 166 may have access protections such as read-write 230 or read-only 232. Common memory 166 may lack protections such as preventing a thread of execution 224 from jumping to an arbitrary address in common memory 166.

The processor 106 may have the following aspects. For example, the processor 106 may include a Central Processing Unit (CPU), a microprocessor, a microcontroller, or a system-on-a-chip. The processor 106 may include an enclave-aware processor 124. A processor 106 may execute privileged instructions 242, unprivileged instructions 254, enclave-aware instructions 128, or restricted instructions 204. The processor 106 may include a single processor 106 or multiple processors 106 in a single processing unit (e.g., a central processing unit) or multiple processing units (e.g., a central processing unit and a graphics processing unit; or a central processing unit and a memory manager) and may include multiple processors 106 where one processor 106 is capable of executing one or more of the elements described herein, and a subsequent processor 106 or processors may execute other elements as described herein, capable of executing all elements only in combination.

Processor instructions 120 may include the following aspects. Processor instructions 120 may include privileged instructions 242, which may be used to interact directly with hardware, such as partitioning memory 108 and configuring the processor 106. Privileged instructions 242 may give a thread access to every process 222 in the system 100. Privileged instructions 242 may create, initialize, and delete enclaves 104. It should be appreciated that, for safety and security, partitioned workloads 252 may not have direct access to privileged instructions 242. Processor instructions 120 may also include unprivileged instructions 254, for example arithmetic instructions 230. Processor instructions 120 may include enclave-aware instructions 128 or restricted instructions 204. For example, processor instructions 120 may include low-level machine instructions, an instruction set, bytecode, or machine language.

The usermode process 150 may include the following aspects. The usermode process 150 may perform a substantial portion of the workload 252 of the system 100. It should be appreciated that the usermode process 150 may allow for the various partitioning schemes to isolate the workloads 252, improving safety and security. The usermode process 150 may allow for only a subset of processor instructions 120 to execute which may be known as unprivileged instructions 254.

Enclave-aware instructions 128 may be processor instructions 120 and may include the following aspects. Enclave-aware instructions 128 may fall into two categories, including privileged enclave-aware instructions 256 for managing enclaves, and unprivileged enclave-aware instructions 258 for interoperating with an enclave 104. For managing enclaves, the privileged enclave-aware instructions 256 may create, verify, initialize, or destroy an enclave 104. For interoperating with and using an enclave 104, unprivileged enclave-aware instructions 258 may enter or exit an enclave 104, may use in-enclave cryptography 260, and may securely determine enclave 104 attribution.

Restricted instructions 204 may be processor instructions 120 and may include the following aspects. Restricted instructions 204 may include unprivileged instructions 254, which may be run within usermode process 150. Restricted instructions 204 may include instructions that may not run within an enclave 104. For example, restricted instructions 204 may include system calls 232, for example, "SYSCALL", hypervisor 226 calls, for example, "CPUID" or "VMCALL", or the like. Some standard libraries abstract system calls 232 for many usermode programs. Standard libraries may provide a gateway for programs to access resources managed by the operating system 148.

The enclave-aware processor 124 may be a processor 106 and may include the following aspects. The enclave-aware processor 124 may be configured to create and use enclaves 104, execute enclave-aware instructions 128, and execute restricted instructions 204.

Figure 8:
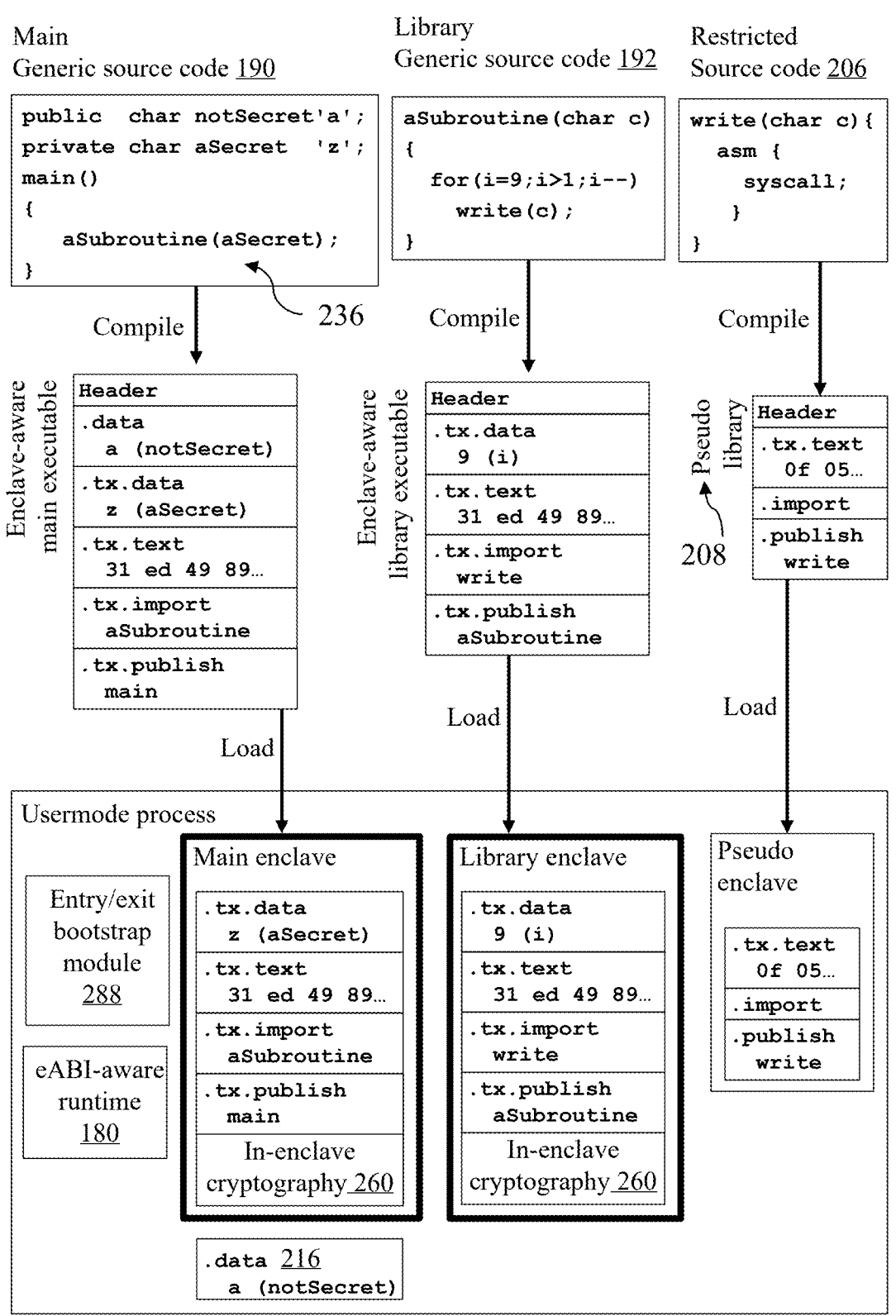
FIG. 8 is an entity-relationship diagram illustrating how source code may be compiled into executables and loaded into the usermode process, according to another embodiment of the present disclosure.

The source code 188 may include the following aspects. For example, the source code 188 may be written in C, C++, Go, or Rust, among others. The source code 188 may include a main source code 236 that includes an entry point 262 and may make external calls 214 into libraries (FIG. 8). The source code 188 may also include a library source code 264. Source code 188 may include published symbols 194 and external symbol dependencies 184.

The source code 188 may include generic source code 118, which is backwards-compatible with respect to this disclosure. Generic source code 118 would not include enclave-aware source code parameters 268, nor would it include any enclave-aware storage classes 270 such as "public" and "private" to indicate if data 216 should be stored in common memory 166 or in enclaves 104.

The source code 188 may also include an enclave-aware source code 142 that includes enclave source code parameters 144 or enclave-aware storage classes 270. For example, "#pragma txMaxThreads" and "private" have been added to interoperate with an enclave 104. The enclave-aware source code 142 may inform the enclave-aware compiler 122 that this program only needs one thread of execution 224. For example, the source code 188 may request that the enclave-aware compiler 122 keep the integer "i" inside the enclave 104 and share the contents of the variable 286 with the "printf" function via the eABI 114:

```
#pragma txMaxThreads 1
#include <stdio.h>
int main( ) {
  for( private int i=0 ; i<10 ; i++ )
  {
    printf( "%d\n", i );
  }
}
```

The source code 188 may also include a standard library source code 264. The standard library source code 264 may be generic source code 118 or enclave-aware source code 142. The standard library source code 264 may be refactored by developers into unrestricted standard library source code 272 and restricted standard library source code 274. The unrestricted standard library source code 272 may run in an enclave 104. It should be appreciated that executing the restricted standard library source code 274 in its own enclave 104 improves the safety and security of the system 100 in several ways, for example, by protecting the restricted standard library source code 274 from tampering by requiring a digital signature 228 by a trusted author, preventing return-oriented programming or ROP attacks by denying software outside of the enclave 104 from directly jumping into the restricted standard library source code 274, and maintaining unpublished variables 286 as private within the enclave 104 and unable to be viewed or manipulated by non-standard library software. The restricted standard library source code 274 may include restricted instructions 204 and instructions 218 related to the eABI 114 that facilitate interoperability with the rest of the standard library 282. The restricted standard library source code 274 must run in common memory 166 and may include non-enclave 104 protections to ensure it may be not tampered with. For example, the restricted standard library source code 274 may reside within kernel memory 108 and may not be directly accessible from the usermode process 150 but may be called by an enclave-aware standard library 276.

Figure 4:
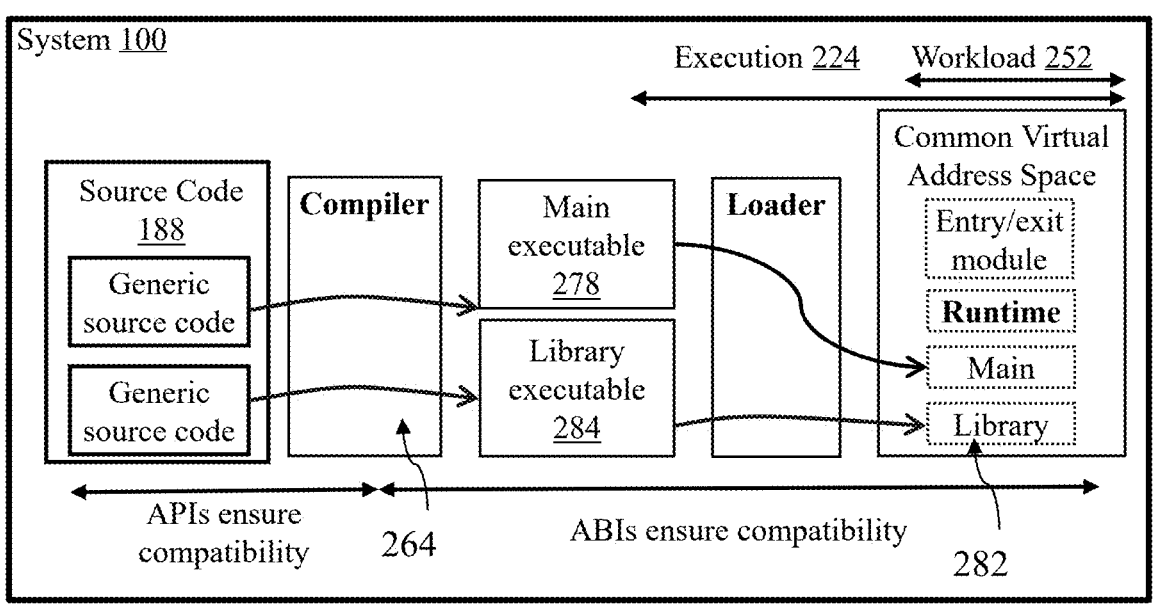
FIG. 4 is a prior art schematic diagram illustrating the toolchain used to compile generic source code into executables and how the executables are loaded into a common virtual address space, where the domains of Application Programming Interfaces (APIs) and Application Binary Interfaces (ABIs) are also shown.
Figure 6:
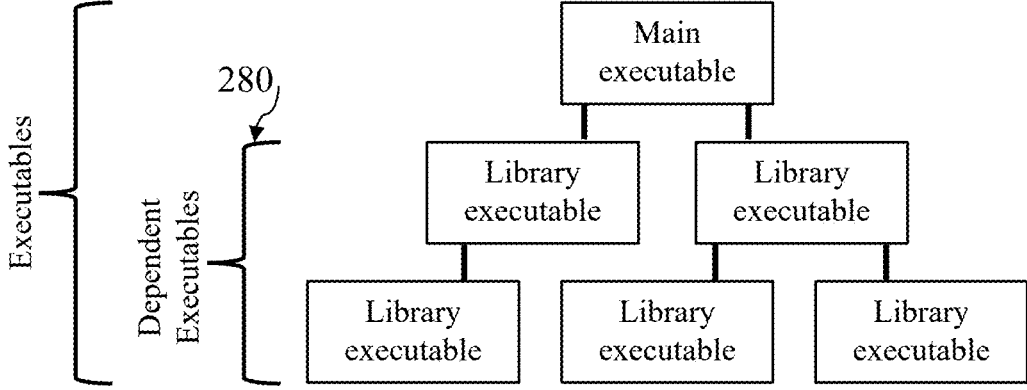
FIG. 6 is a prior art schematic diagram illustrating how a main executable depends on library executables, which may depend on other library executables.
Figure 9:
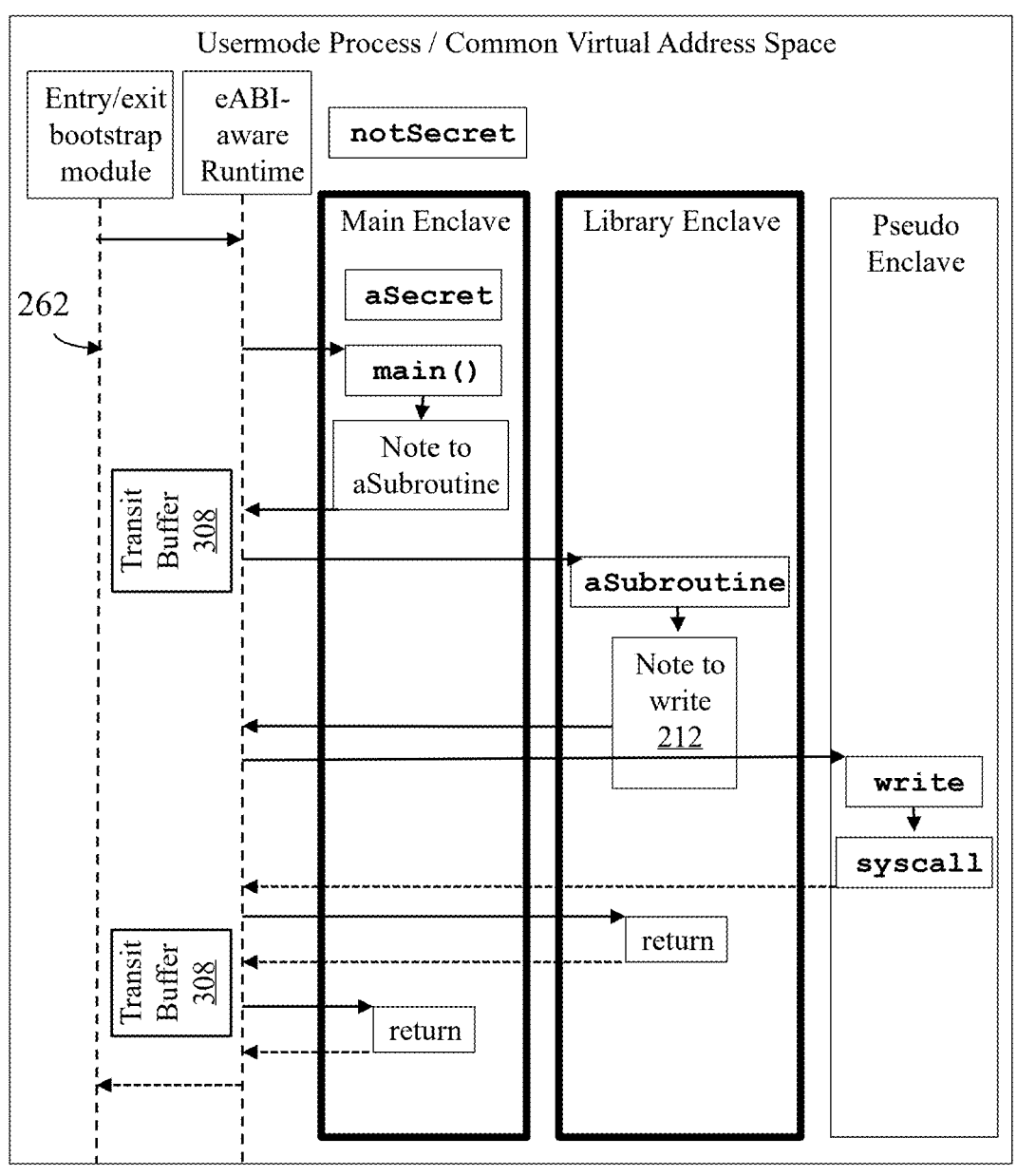
FIG. 9 is a sequence diagram illustrating how a thread of execution may flow through the entities as shown in FIG. 8 to execute a process, according to another embodiment of the present disclosure.
Figure 11A:
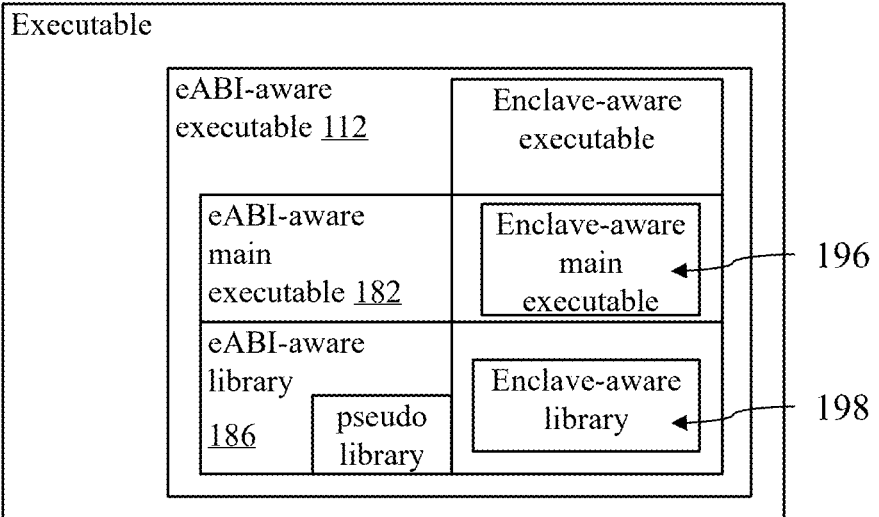
FIG. 11A is a schematic diagram illustrating various types of executables, according to another embodiment of the present disclosure.
Figure 11B:
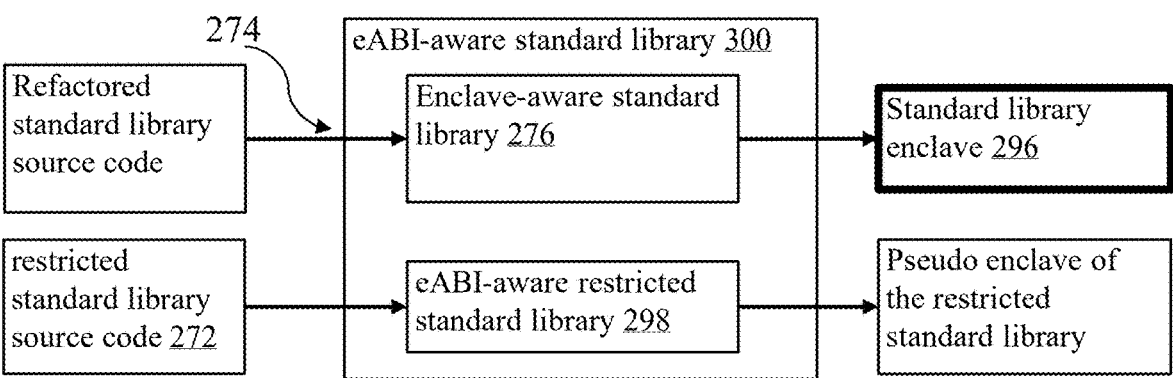
FIG. 11B is a schematic diagram illustrating how a standard library source code may be refactored to separate restricted instructions into a pseudo enclave, according to another embodiment of the present disclosure.
Figure 11C:
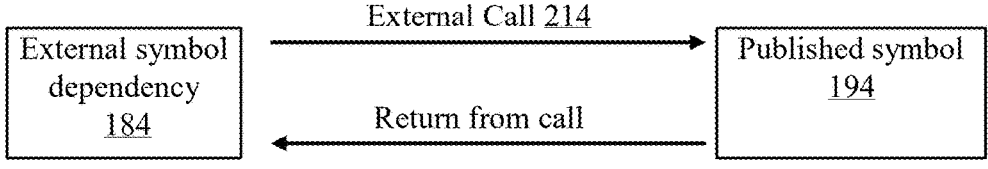
FIG. 11C is a schematic diagram illustrating the lifecycle of an external call from an external dependency to a published symbol and back, according to another embodiment of the present disclosure.
Figure 11D:
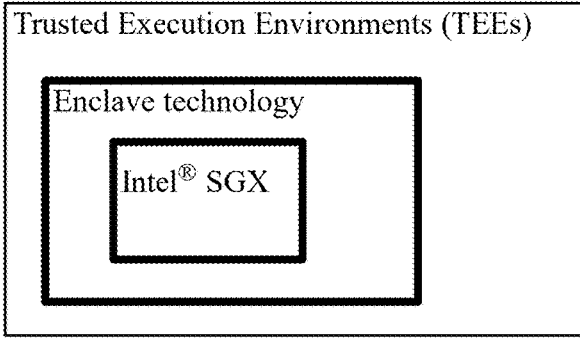
FIG. 11D is a schematic diagram illustrating various types of confidential computing implementations.
Figures 16, 17:
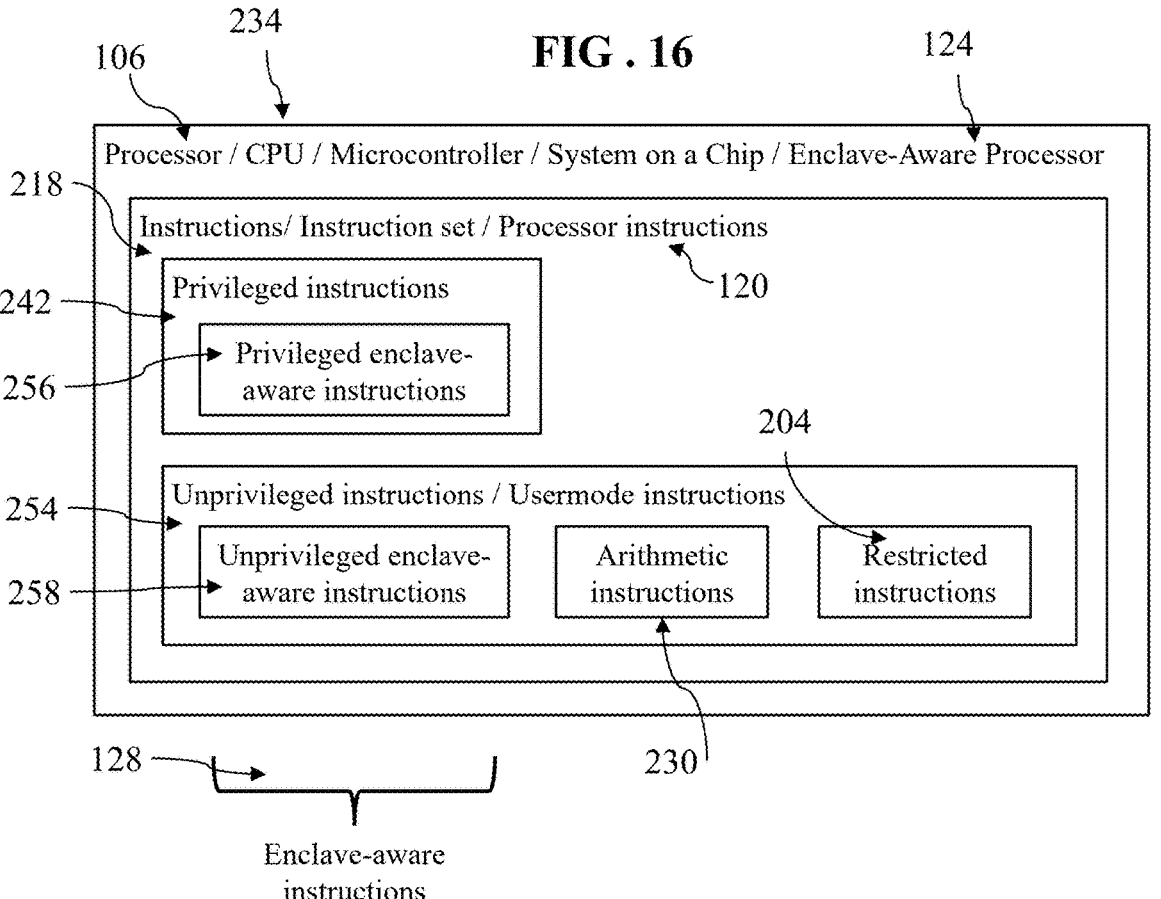
FIG. 16 is a table illustrating various partitioning and isolation schemes, according to another embodiment of the present disclosure.
FIG. 17 is a schematic diagram illustrating enclave-aware instructions and system hardware, according to another embodiment of the present disclosure.
Figure 18:
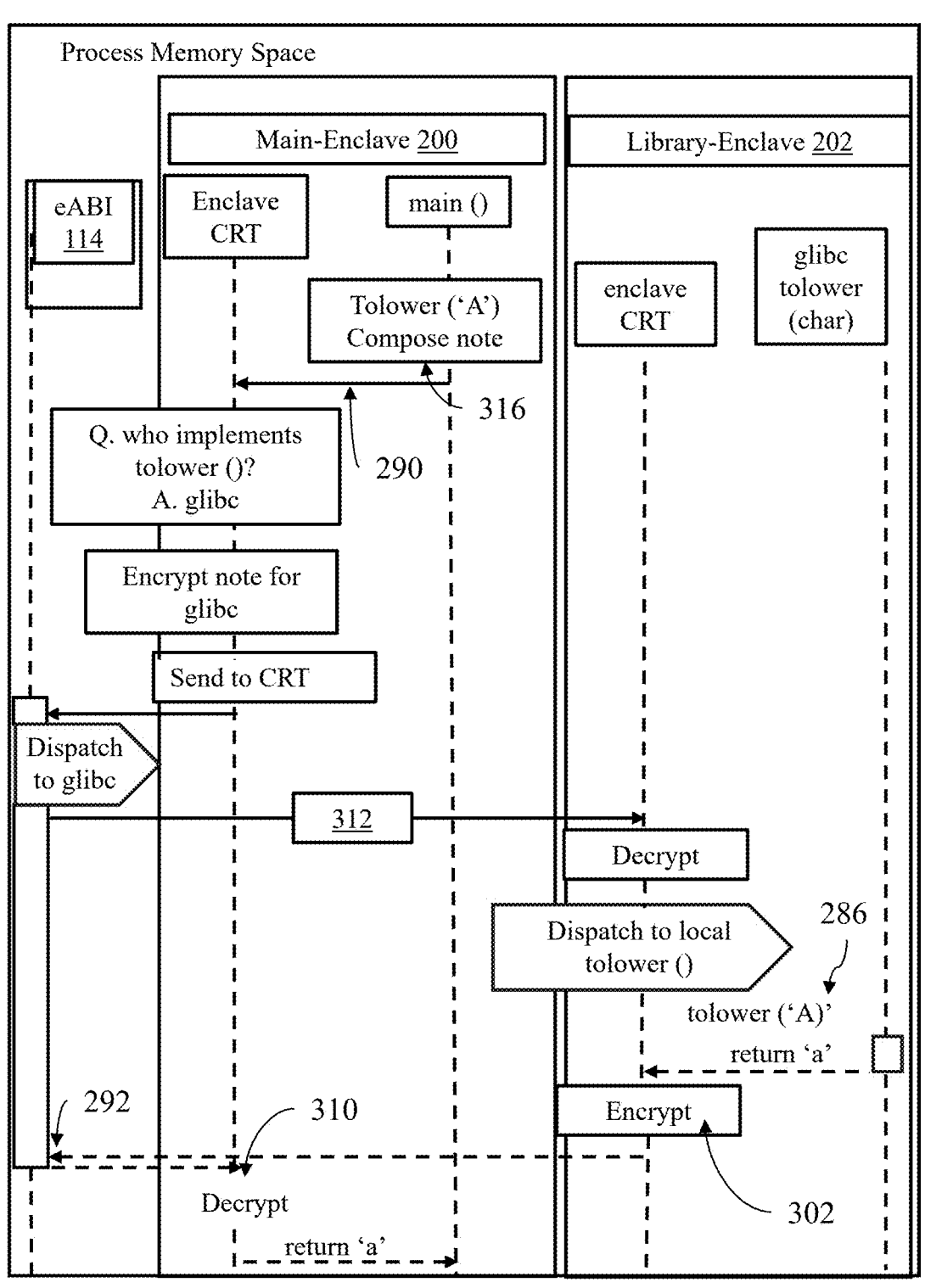
FIG. 18 is a sequence diagram illustrating a thread of execution, according to another embodiment of the present disclosure.
Figure 19:
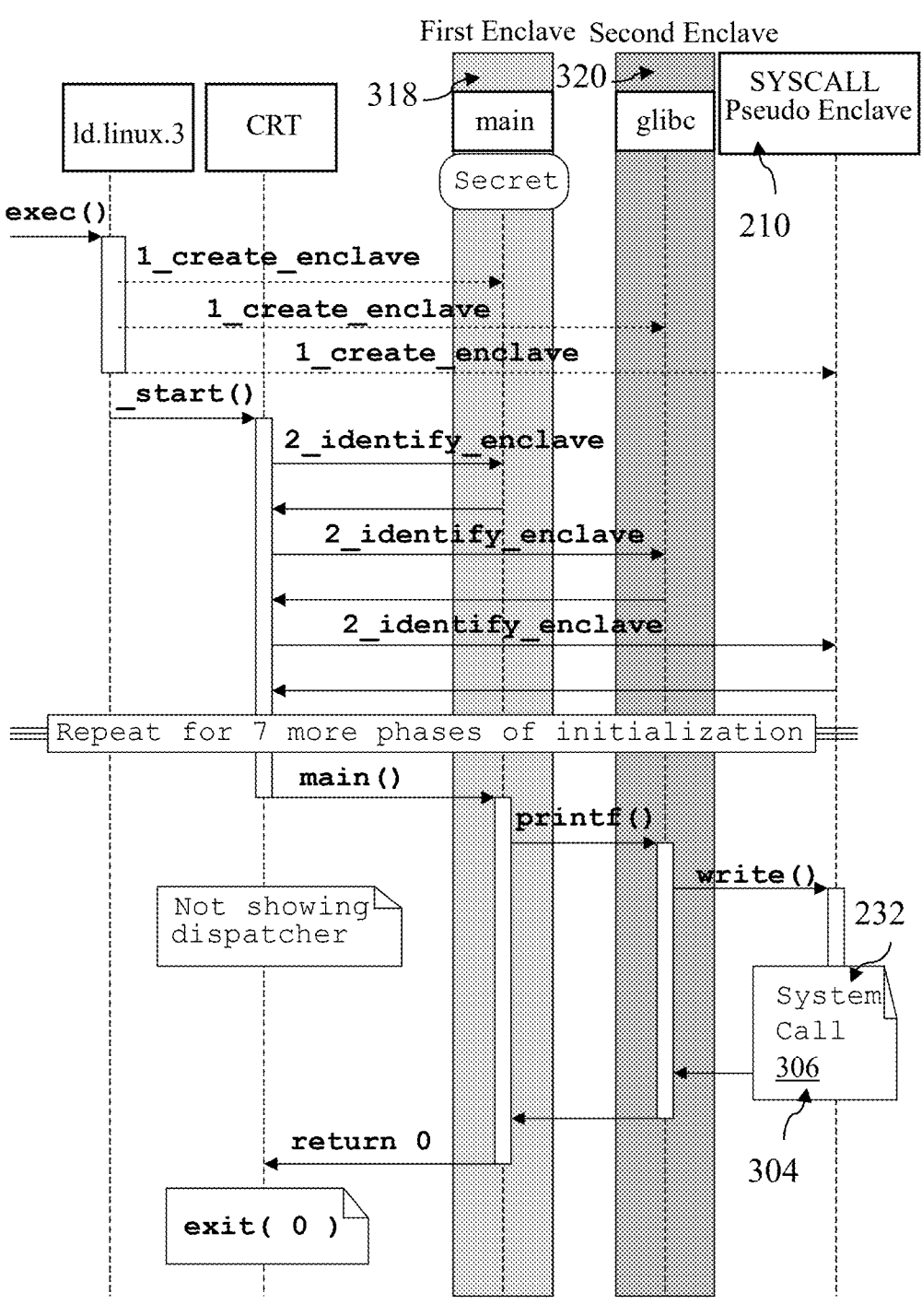
FIG. 19 is a sequence diagram illustrating a thread of execution during eABI-aware runtime initialization, according to another embodiment of the present disclosure.

The executables 110 may include the following aspects. Executable files may be loaded into memory 108 to be executed. For example, executable files may include metadata, a set of headers, and a set of sections 152 (FIG. 7A). In another example, executables 110 may be files generated by compilers from source code 188 (FIG. 4). Executables 110 may include a main-executable 278 and dependent executables 280 such as a library executable 284 (FIG. 6). Executables 110 may include an eABI-aware executable 112, an eABI-aware main-executable 286, an eABI-aware library 186, an enclave-aware executable 126, an enclave-aware main-executable 288, an enclave-aware library 198, and a pseudo library 208 (FIG. 11A). The executable 110 may access data 216 and external instructions 218, located outside the executable 110, via a published symbol 194 (FIGS. 8 and 9). This creates a dependency on another executable 110 via an external symbol dependency 184.

Executables 110 may include a table of external symbol dependencies 184. Executables 110 may also publish symbols 194 that other executables 110 may run. For example, a library-enclave 202 may publish a symbol 194 and be a dependent executable 280. When a dependent executable 280 has been identified, but not yet loaded into memory 108, the dependent executable 280 may be referred to as an unloaded dependent executable 280. An enclave-aware loader 146 may recursively load all unloaded dependent executables 280 until they are all loaded.

Figure 5:
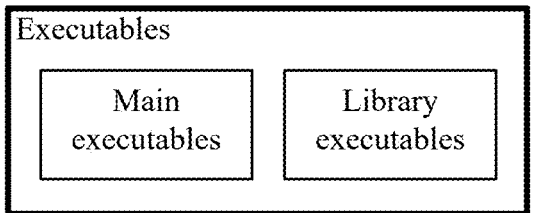
FIG. 5 is a prior art schematic diagram illustrating the types of executables.

The eABI-aware main executable 182 and enclave-aware main executables 196 may be a type of executable 110 (FIGS. 5 and 11A) and may include the following aspects. Main executables 278 may include a specialized published symbol 194 called an entry point 262 that the entry/exit bootstrap module 288 may be configured to call into.

Each of the eABI-aware library 186, the enclave-aware library 198, and the pseudo library 208 may be a type of executable 110 (FIGS. 5 and 11A) and may include the following aspects. A library executable 284 may include one or more published symbols 194 that the main executable 278 or other library executables 284 will externally call. The published symbols 194 may be in a symbol table 314 that the enclave-aware loader 146 will examine. If the enclave-aware loader 146 determines that an eABI-aware library 186 or pseudo library 208 is a dependent executable 280, it will get loaded into memory 108 (FIG. 6).

The eABI-aware executable 112 may be a type of executable 110 (FIG. 11A) and may include the following aspects. eABI-aware executables 112 may be loaded into common memory 166 or an enclave 104. The eABI-aware executable 112 may be configured to interoperate with other eABI-aware executables 112 via the eABI 114. The eABI-aware executables 112 may have backwards compatibility to interoperate with traditional, non-eABI-aware executables 110. For example, eABI-aware executables 112 may include an eABI-aware main-executable 286, an eABI-aware library 186, a pseudo library 208, and all enclave-aware executables 126 (FIG. 11A). The eABI-aware executable 112 may be compiled from generic source code 118 using an enclave-aware compiler 122.

The enclave-aware executable 126 may be a type of eABI-aware executable 112 and may have the following aspects. The enclave-aware executable 126 may include enclave-aware instructions 128 and may be configured to execute within an enclave 104. The enclave-aware executable 126 may include an enclave-aware main executable 196 and an enclave-aware library 198. The enclave-aware executable 126 may include a protected section 156 and an unprotected section 154. The enclave-aware executable 126 may be compiled from generic source code 118 using an enclave-aware compiler 122. Alternatively, the enclave-aware executable 126 may be compiled from enclave-aware source code 142. Enclave-aware executables 126 may only be run by an enclave-aware processor 124. It should be appreciated that an enclave-aware executable 126 may be compiled on any processor 106, as the processor 106 may be configured to compile an enclave-aware executable 126 but not configured to run the enclave-aware executable 126, e.g. with cross-compilation. The enclave-aware main executable 196 may include an entry point 262 for the entry/exit bootstrap module 288. The enclave-aware library 198 may also include a published symbol 194.

The eABI-aware compiler 116 may include the following aspects. The eABI-aware compiler 116 may be configured to translate generic source code 118 into an eABI-aware executable 112. The eABI-aware compiler 116 may also generate instructions 218 that support the eABI 114, initialize/finalize data 216 structures, and manage threads of execution 224. The eABI-aware compiler 116 may be configured to produce executables 110 that are backwards-compatible with non-eABI-aware executables 110. The eABI-aware compiler 116 may also be configured to produce enclave-aware executables 126. The eABI-aware compiler 116 may generate executables 110 directly for a target platform or produce intermediate object files that are later linked together to create the final executable 110 that must conform to specified interoperability standards. The eABI-aware compiler 116 may also include options for targeting alternate hardware architectures, and alternate eABIs 114 where the alternate system 100 is enclave-aware. The eABI-aware compiler 116 may be configured to translate a portion of the restricted source code 206 into a pseudo library 208. The eABI-aware compiler 116 may produce an eABI-aware executable 112 with protected sections 156.

The eABI-aware compiler 116 may also be configured to identify an external symbol dependency 184 in generic source code 118 and add processor instructions 120 to the eABI-aware executable 112 to resolve the external symbol dependency 184 via an outbound note 290. The eABI-aware compiler 116 may also be configured to add processor instructions 120 to the eABI-aware executable 112 to route the outbound note 290 to the eABI-aware runtime 180 using one or more data security modes 130. The eABI-aware compiler 116 may be configured to identify a published symbol 194 in generic source code 118. The eABI-aware compiler 116 may also be configured to add processor instructions 120 to the eABI-aware executable 112 to receive an inbound note 292 from the eABI-aware runtime 180 using a data security mode 130. The eABI-aware compiler 116 may be configured to add processor instructions 120 to the eABI-aware executable 112 to securely allow external access to the published symbol 194 via the inbound note 292. For example, allowing external access may include executing an external function, returning the value of an external variable 286, or overwriting the contents of an external variable 286. Near the end of the compilation process, an eABI-aware compiler 116 may digitally sign the executable 110. Then, the eABI-aware compiler 116 may add one or more certificates 168 along with the digital signature 228 into the eABI-aware executable 112 (FIG. 7B). The eABI-aware compiler 116 may discover the certificate 168 using environment variables 286, enclave command line parameters 140 or via enclave-aware source code 142.

The enclave-aware compiler 122 may be an eABI-aware compiler 116 (FIG. 12) and may include the following aspects. The enclave-aware compiler 122 may include the same features as an eABI-aware compiler 116 and may be further configured to cross-compile generic source code 118 that, once cross-compiled, may run in an enclave 104 via an enclave-aware executable 126 that include enclave-aware instructions 128. The enclave-aware compiler 122 may be configured to produce processor instructions 120 to resolve the external symbol dependency 184 via the eABI 114. The enclave-aware compiler 122 may also be configured to produce processor instructions 120 to allow external access to the published symbol 194 via the eABI 114. The enclave-aware compiler 122 may be further configured to translate a portion of the generic source code 118 into a section 152. The enclave-aware compiler 122 may also be configured to receive the enclave command line parameter 140. The enclave-aware compiler 122 may also be configured to use the enclave source code parameter 144. It should be appreciated that the enclave-aware compiler 122 may not be required to run on an enclave-aware processor 124 and may simply generate files that must eventually run on an enclave-aware processor 124.

The enclave command line parameter 140 may include the following aspects. The enclave command line parameter 140 may be provided to the enclave-aware compiler 122, e.g. through a command line interface. For example, the enclave command line parameter 140 may instruct the enclave-aware compiler 122 to generate an eABI-aware executable 112, automatically store variables 286 in an enclave 104, configure enclave-specific parameters 294 such as debug-mode or vendor id, configure in-enclave 104 memory 108 options such as stack size and heap size within an enclave 104 and maximum number of threads of execution 224, and configure information for performing an enclave-aware digital signature 228 of the executable 110 or other eABI-specific information.

The enclave source code parameter 144 may include the following aspects. Enclave source code parameters 144 may include pragmas, as shown in this paragraph, to convey enclave 104 related information in source code 188 or assign a storage classes 270 for variables 286 like "public" and "private" to indicate if variables 286 should be stored in common memory 166 or in enclaves 104. It should be appreciated that enclave-aware source code 142 may also convey some of the same information conveyed in enclave command line parameters 140, such as default storage class 270, enclave-specific parameters 294, in-memory 108 options, and digital signature 228 information. For example, the enclave source code parameters 144 may include "#pragma txMaxThreads", and "#pragma txVendorID":

```
#pragma txMaxThreads 8      // Allow up to 8 threads
#pragma txVendorID 1138     // Set SGX vendor ID to 1138
```

The section 152 may include the following aspects. A section 152 may be a protected section 156 or an unprotected section 154 (FIG. 14). A protected section 156 may be loaded into an enclave 104. An unprotected section 154 may be loaded into common memory 166. The protected section 156 may be digitally signed by the enclave-aware compiler 122 by an enclave-compatible cryptographic key 170. It should be appreciated that protected sections 156 may only be found in an enclave-aware executable 126. The protection may be enforced via an enclave-compatible digital signature 228 and by virtue of being loaded into an initialized enclave 104, which guarantees authenticity and preserves privacy. Protected sections 156 may include a protected text section 158 or a protected data section 160. For example, the name of a protected section 156 may start with ".tx" and have names like ".tx.text" and ".tx.data".

Unprotected sections 154 may include an unprotected text section 162 or an unprotected data section 164. An unprotected text section 162 may include a restricted instruction 204 that may not run inside an enclave 104. For example, an eABI-aware executable 112 such as a pseudo library 208 may be composed entirely of unprotected sections 154 that are loaded into common memory 166 to execute a restricted instruction 204 on behalf of software running in an enclave 104.

The protected data section 160 may be loaded into an enclave 104 and may not include processor instructions 120. The protected text section 158 may be loaded into an enclave 104 and may contain processor instructions 120. The protected text section 158 may not include a restricted instruction 204 (FIGS. 1, 7B, and 8). The section 152 may include a digital certificate 168 that is used by the enclave-aware loader 146 but not used by the usermode process 150.

The enclave-aware loader 146 may include the following aspects. The enclave-aware loader 146 may map sections 152 into memory 108 (FIG. 7A) based on their flags and configure the memory 108 based on a section's 152 attributes. The enclave-aware loader 146 may be configured to analyze the enclave-aware executable 126, then load unprotected sections 154 into common memory 166 and load protected sections 156 into an enclave 104 (FIG. 7B). The enclave-aware loader 146 may also be configured to create an instance of the enclave 104 in the memory 108, add protected sections 156 from the enclave-aware executable 126 into the enclave 104, and initialize the enclave 104. It should be appreciated that, in combination with the enclave-aware compiler 122, the system 100 allows generic source code 118 to benefit from the safety and security of enclave 104 technology without having to be specifically programmed to use enclaves. After the loader initializes the enclave 104, the enclave 104 may interoperate with the eABI-aware runtime 180. The enclave-aware loader 146 may also be configured to load a portion of the eABI-aware runtime 180 or entry/exit bootstrap module 288 into the memory 108. The enclave-aware loader 146 may also be configured to analyze the enclave-aware main executable 196 and create a main-enclave 200 in the memory 108. The enclave-aware loader 146 may also be configured to analyze the enclave-aware library 198 and create a library-enclave 202 in the memory 108.

The enclave-aware loader 146 may also be configured to perform validation of certificates 168 and the PKI 172. The validation may include analyzing an executable 110 to ensure the headers, metadata, and segments are valid and accessible, extracting a certificate 168 from an eABI-aware executable 112, verifying that each certificate 168 in the certificate's 168 trust chain is valid, for example, by checking timestamps, allowed usage, and potential alterations. The validation may also include securely verifying the certificate's 168 trust chain is trusted according to a set of trusted root certificates 168 stored in the system 100. For example, the topmost certificate 168 in the chain of trust may be a member of the set of trusted root certificates 168. The validation may also include securely accessing the production mode 174. If the production mode 174 is active and the certificate 168 is untrusted, the enclave-aware loader 146 may stop the loading process 222 and inform the user. If the production mode 174 is inactive, the enclave-aware loader 146 may allow the loading process 222 to continue. It should be appreciated that production mode 174 ensures that every eABI-aware executable 112 is trusted, and this increases the safety and security of everyday users. It should be appreciated that disabling production mode 174 allows developers to compile or test unsigned, untrusted code. The validation may also include extracting an enclave-compatible cryptographic key 170 from the certificate 168, and using the enclave's 104 initialization process 222 to ensure the enclave 104 has not been altered since it was compiled.

The enclave-aware loader 146 may also be configured to perform a loading sub-process 222 for each eABI-aware executable 112. The enclave-aware loader 146 may recursively load all un-loaded dependent executables 280 until they are all loaded, recursively resolve the dependencies for each executable 110, load them into memory 108, and resolve their published symbols 194. Each time an executable 110 is loaded, the enclave-aware loader 146 may execute the loading sub-process 222 on that executable.

The enclave-aware loader 146 may also start the program using the eABI-aware runtime 180 to load un-loaded dependent executables 280 on-demand. The loading sub-process 222 may be configured to analyze the eABI-aware executable 112. The loading sub-process 222 may be configured to load each portion of the unprotected section 154 of the eABI-aware executable 112 into a common memory 166 when the eABI-aware executable 112 includes the unprotected section 154. The loading sub-process 222 may also be configured to load a portion of a protected section 156 of the eABI-aware executable 112 into an enclave 104 when the eABI-aware executable 112 includes the protected section 156. The loading sub-process 222 may also be configured to evaluate the eABI-aware executable 112 for an un-loaded dependent executable 280 including a published symbol 194. Once the eABI-aware executable 112 is evaluated, the loading sub-process 222 may be configured to recursively perform the loading sub-process 222 on the un-loaded dependent executable 280 for each un-loaded dependent executable 280. The loading sub-process 222 ensures that all necessary functions and data 216 are available for the executable 110 to run.

The PKI 172 may include the following aspects. The PKI 172 may secure communication and data 216 exchange by utilizing cryptographic methods based on public and private keys, combining public key infrastructure with a private key used for signing an enclave 104 (FIG. 3B). The PKI 172 may include a hierarchy of trust that may allow users to trust publishers of enclaves 104. For example, the system 100 may include a set of root certificates 168 that it trusts. Publishers of enclave-aware executables 126 may be issued certificates 168 with keys used to sign enclave-aware executables 126. When the enclave-aware executables 126 are loaded, the enclave-aware loader 146 or operating system 148 may verify the certificate 168, verify the trust hierarchy, and verify whether the root certificate 168 is trusted. It should be appreciated that the certificate 168 ties an enclave-aware executable 126 to the publisher, holds publishers accountable for the content in the enclave-aware executables 126 they sign, and provides nonrepudiation of publishers. For example, the PKI 172 may also include hierarchies to blacklist Certificate Authorities (CAs), specific publishers, or specific enclave-aware executables 126. The PKI 172 may work with a production mode 174 to ensure that a trusted publisher must sign every enclave 104. When production mode 174 is active, anonymous executables 110 such as custom-built malware, may not execute on the system 100. Developers and publishers may write and test code by deactivating production mode 174, or by trusting their own signing certificate 168. The production mode 174 may require the computing environment 102 to include management of the production mode 174, management of the set of trusted root certificates 168 for eABI-aware executables 112, for example, via a secure UEFI, secure boot environment, or trusted operating system 148. The production mode 174 may also provide the enclave-aware loader 146 and operating system 148 secure access, including access to the set of trusted root certificates 168 for eABI-aware executables 112.

The certificate 168 may include the following aspects. The certificate 168 may be derived from the PKI 172. The certificates 168 may be issued to publishers or developers. For example, a publisher may bind the certificate 168 to a key pair, where the publisher may create a public-private key pair, use the key pair to create a certificate 168 signing request that includes information that identifies the publisher, verifies their identity with a Certificate Authority (CA) who ensures that the publisher's identity matches the identity on the certificate 168 and, if the publisher's identity is valid, the CA will issue a signed certificate 168 derived from the certificate 168 signing request. In another example, an individual may create a public-private key pair, use the key pair to create a self-signed certificate 168, add the self-signed certificate 168 to the set of trusted root certificates 168 for enclave-aware executables 126, thus allowing the individual to write/test software but not publish it elsewhere.

The certificate 168 signing request may include an enclave-compatible cryptographic key 170. The certificate 168 should, however, cryptographically bind an enclave-compatible cryptographic key 170 to the certificate 168, thus extending the ability to trust a signed enclave 104 from an enclave-compatible cryptographic key 170 to a PKI-based hierarchy of trusted certificates 168. It should be appreciated that the present disclosure contemplates combining two existing technologies 1) PKI 172 for browsers and 2) signed enclaves, thereby creating a mechanism for trusting enclave-aware executables 126 that parallels the mechanism for trusting websites.

The enclave 104 may include the following aspects. The enclave 104 may include a main-enclave 200 or a library-enclave 202. The enclave 104 may be mapped into the common virtual address space 220 and may have unique security properties. A process 222 may have many enclaves. Data 216 and instructions 218 in an enclave 104 may be mapped from protected sections 156 of an executable 110. These protected sections 156 may be digitally signed. The enclave 104 may ensure the data 216 and instructions 218 added to the enclave 104 have not been tampered with since they were signed. For example, when a thread of execution 224 is outside the enclave 104, attempts to access the contents of an enclave 104 may fail. When a thread of execution 224 is inside an enclave 104, attempts to access data 216 within that enclave 104 may succeed. Furthermore, attempts to access memory 108 in common memory 166 will also succeed. Finally, attempts to access memory 108 in other instances of enclaves 104 will fail. The main-enclave 200 may be configured to interoperate with the library-enclave 202 using the enclave-aware processor 124 via the eABI-aware runtime 180. The main-enclave 200 may be loaded from an enclave-aware main executable 196 compiled from main generic source code 190. A main-enclave 200 may include a published symbol 194, or entry point 262, that the entry/exit bootstrap module 288 will call into. A main-enclave 200 may include dependent executables 280 that include data 216 and instructions 218 required for the main-enclave 200 to run. A library-enclave 202 may be loaded from an enclave-aware library 198 compiled from library generic source code 192. A library-enclave 202 may include a published symbol 194 that the main-enclave 200 or other library-enclaves 202 may call. The library-enclave 202 may be a dependent executable 280. The library-enclave 202 may also include dependent executables 280. The enclave 104 may also include a standard library enclave 296 loaded from an enclave-aware standard library executable 284.

Prior to initialization, the contents of an enclave 104 may be visible by the operating system 148, however, the enclave-aware processor 124 may not run the instructions 218. Upon initialization, the enclave 104 may be attested to verify its integrity and authenticity, ensuring that it has not been tampered with and conforms to the expected configuration. Once initialized, the enclave 104 may securely store and process 222 sensitive information, such as a protected section 156 from an enclave-aware executable 126, an enclave-compatible cryptographic key 170, or other personal data 216 or proprietary algorithms, while preventing unauthorized access from outside the enclave 104. During initialization, the enclave 104 may be cryptographically verified to ensure it is authentic. After a successful validation, the contents of the enclave 104 may not be visible to the operating system 148, and the instructions 218 within the enclave 104 may be executed by the enclave-aware processor 124. It should be appreciated that the process 222 of initializing an enclave 104 may ensure that the enclave 104 is authentic, genuine, and has not been tampered with since the enclave 104 was digitally signed. The digital signature 228 may be signed by an enclave-compatible cryptographic key 170. The enclave-compatible cryptographic key 170 used for the digital signature 228 may be a different key than the key used for enclave 104 attestation (the verification of one enclave 104 from another enclave 104). Alternatively, an enclave-compatible cryptographic key 170 may be shared between multiple enclaves 104 for digital signatures 228 and attestation. The enclave 104 may then be provisioned to allow access to the usermode process 150, which may determine security and visibility properties. The enclave 104 may be mapped into the common virtual address space 220. The enclave 104 may also be configuring the security properties or visibility of the enclave 104. After an enclave 104 is provisioned, it may be used by the usermode process 150. The enclave 104 may be validated, cryptographically ensuring the enclave 104 is available in "usermode" and is the intended enclave 104. For example, validation may include ensuring that the operating system 148 has not mapped a malicious enclave 104 instead of the intended one.

The enclave 104 may employ a combination of cryptographic techniques and enforcement mechanisms to create a secure boundary in the memory 108, for example, Intel® Software Guard Extensions (SGX) enclave technology, AMD® Secure Encrypted Virtualization (SEV) enclave technology, ARM® TrustZone® isolation technology, Apple® Secure Enclave security module, RISC-V® Keystone Enclave open-standard technology, Qualcomm® Secure Execution Environment (QSEE) trusted execution environment, or Huawei® Trusted Execution Environment. The enclave 104 may be implemented various ways, such as with CPU 234 instructions, memory 108 managers, hypervisors 226, or dedicated hardware. It should be apparent to one skilled in the art that the cryptographic techniques, enforcement mechanisms, and ways of implementation listed herein are not exhaustive.

Initializing an enclave 104 may include creating and validating the enclave 104. Initializing an enclave 104 may also include ensuring an enclave-compatible cryptographic key 170 used to initialize the enclave 104 is trusted by the system 100. Initializing an enclave 104 may also include creating secure identities for each enclave 104. Initializing an enclave 104 may include authenticating, attesting or validating the other enclaves 104 in the process. Initializing an enclave 104 may also include evaluating the trustworthiness of the other enclaves 104 in the process 222. Initializing an enclave 104 may include creating private, unique, secure enclave-compatible cryptographic key 170 for use between enclaves 104. Initializing an enclave 104 may include automatically initializing in-enclave 104 data 216 structures such as a private stack and/or a private heap, without significant developer involvement. Initializing an enclave 104 may include securely querying the other enclaves 104 in the process 222 and obtaining their published symbols 194. Initializing an enclave 104 may also include maintaining a map of external symbol dependencies

184 and which enclave 104 or enclaves 104 contain semantically-compatible published symbols 194. Initializing an enclave 104 may also include informing the runtime or other enclaves 104 that the enclave 104 is initialized.

The thread of execution 224 may have the following aspects. The thread of execution 224 may refer to a sequence of instructions 218 executed by a processor 106 and may represent the smallest unit of processing that may be scheduled independently by an operating system 148. The thread of execution 224 may also execute processor instructions 120 on a processor 106. The thread of execution 224 may also use enclave-aware executables 126 to enter or exit the enclave 104. The thread of execution 224 may share its resources such as the common virtual address space 220, open files, and execution state, while maintaining its own independent execution flow. For a thread of execution 224 to access data 216 in two enclaves 104, the thread of execution 224 must first leave the first enclave 318 and then enter the second enclave 320. Multiple threads of execution 224 may run concurrently in an enclave-aware system 100. The thread of execution 224 may run inside an enclave 104, executing an instruction whose address is inside an enclave 104 and accessing data 216 or other instructions within the enclave 104. However, the thread of execution 224 may not execute a restricted instruction 204. When a thread of execution 224 is executing an instruction 218 outside an enclave 104, the thread of execution 224 may execute a restricted instruction 204.

The pseudo enclave 210 may include the following aspects. The pseudo enclave 210 may be configured to be loaded into and operate within common memory 166 and may include restricted instructions 204. The pseudo enclave 210 may also be configured to execute the restricted instructions 204, and map unprotected sections 154 from eABI-aware executables 112. The pseudo enclave 210 may also include a standard library pseudo enclave 210 loaded from an eABI-aware restricted standard library 298 and may be in common memory 166. The standard library pseudo enclave 210 may also include additional protections such as not being in the common memory 166 of a usermode process 150. It should be appreciated that a pseudo enclave 210 may facilitate the workload 252 within an enclave 104 by executing instructions 218 that cannot be run inside an enclave 104.

The pseudo library 208 may include the following aspects. The pseudo library 208 may include the restricted instruction 204. The pseudo library 208 may be configured to load into common memory 166. The pseudo library 208 may also be configured to execute the restricted instruction 204 on an enclave-aware processor 124. By executing the restricted instruction 204, the pseudo library 208 may interoperate with the eABI 114. The pseudo enclave 210 may be created from an eABI-aware executable 112 that is not configured to run inside an enclave 104. The pseudo library 208 may also include unprotected sections 154. A pseudo library 208 may be loaded using the loading sub-process 222, but the digital signatures 228 will not be secure.

The eABI-aware standard library 300 may include an enclave-aware standard library 276. The eABI-aware standard library 300 may be compiled from restricted standard library source code 274 and may be loaded in common memory 166. The enclave-aware standard library 276 may be compiled from restricted standard library source code 274 to be run in an enclave 104.

The eABI 114 may have the following aspects. The eABI 114 may include standards and details of how functions are called, for example, how registers are to be used, what data 216 type sizes and alignment, system calls 232, and binary file formats are required, and how external symbols are referenced. The eABI 114 may facilitate secure function calls and securely sharing data 216 between enclaves 104 and pseudo enclaves 210. The eABI 114 may also be backwards-compatible with executables 110 that are compliant with the other ABIs. The eABI 114 may use existing calling conventions for intra-executable subroutines, such as subroutines within the same executable. For example, when a program links dynamically to a shared library, the eABI 114 ensures that the function calls and data 216 structures used by the program are interpreted correctly by the library, and that changes to a library or system 100 do not break compatibility with existing binaries. Unlike other ABI architecture, however, the eABI 114 may function where threads of execution 224 do not have access to the entire common virtual address space 220 in the usermode process 150. The eABI 114 may work in conjunction with an eABI-aware executable 112, an enclave-aware loader 146, and an eABI-aware runtime 180 to improve the safety and security of a computing environment 102. It should be appreciated that the eABI 114 allows for enclaves 104 to interoperate with pseudo enclaves 210 in order to system efficiency and dynamic security options.

The eABI-aware runtime 180 may include the following aspects. The eABI-aware runtime 180 may include a collection of executables 110 and initialization code that handle essential tasks, for example, memory 108 management, program startup, and cleanup, and may set up the execution environment by initializing global variables 286, preparing the stack, and invoking the program's entry point 262 or main function. In another example, the eABI-aware runtime 180 may also manage low-level operations like heap allocation, I/O processing, and interfacing with the operating system 148 through system calls 232. Without the eABI-aware runtime 180, enclaves 104 are unable to directly call one another. For example, an enclave 104 may compose a note 212 which is relayed through an eABI-aware runtime 180, which dispatches the note 212 to the intended enclave 104. The eABI-aware runtime 180 may act as a note 212 relay, securely dispatching notes 212 between enclaves 104 and pseudo enclaves 210. This type of relay may also be referred to as a "bridge," "shim," "trampoline," "thunk," etc. For example, the eABI-aware runtime 180 may also include a "double dispatcher." The eABI-aware runtime 180 may maintain backwards compatibility with traditional runtime modules. The eABI-aware runtime 180 may require initialization, for example, by the enclave-aware loader 146 or the entry/exit bootstrap module 288. The eABI-aware runtime 180 and the entry/exit bootstrap module 288 may be implemented as pseudo libraries 208 loaded into common memory 166 or they may be implemented as enclave-aware executables 126 loaded into an enclave 104, or combinations of both.

The entry/exit bootstrap module 288 may have the following aspects. The entry/exit bootstrap module 288 may be loaded into memory 108 by the enclave-aware loader 146. The entry/exit bootstrap module 288 may be configured to initiate or terminate a thread of execution 224. When a usermode process 150 starts, the operating system 148 or runtime environment may create a thread of execution 224 that calls the entry point 262 via the entry/exit bootstrap module 288. An entry/exit bootstrap module 288 may be separated from runtime environments. For example, where the runtime environment is designed to relay notes 212 between enclaves 104, the entry/exit bootstrap module 288 may be configured to initialize the runtime environment and tear it down after the program ends. Furthermore, the entry/exit bootstrap module 288 may be enclave-aware inasmuch as it composes a note 212 which is then passed to the entry point 262 of the main-enclave 200. The entry/exit bootstrap module 288 may be in common memory 166, in an enclave 104 or in some other protected memory 108 region such as the kernel memory 108.

The note 212 may include the following aspects. The note 212 may include an inbound note 292, an outbound note 290, an encrypted note 302, a plaintext note 304, an outbound note 290, a syscall-note 306, and a main-note 316 formed by the entry/exit bootstrap module 288 and routed to the main-enclave 200. The note 212 may be formed inside an enclave 104, or inside a pseudo enclave 210. The note 212 may be configured to interoperate with the eABI 114 via the data security mode 130. For example, the note 212 may include an envelope containing unencrypted fields such as numbers that, when decrypted, verify that the recovered note is usable, a version of the note's 212 ABI, a dispatching flag, a source and target enclave ID, the size of the note 212, and the protection level of the note 212. In another example, the note 212 may also include a payload, which may be encrypted, encoded and/or authenticated, numbers that may be decrypted, one-time-use numbers for preventing replay attacks, encrypted copies of header data 216 to detect tampering, a calling function name and hash, a called symbol name and hash, a set of arguments, a return value, an in-note stack, or an in-note heap. The note 212 may be created, populated, and routed in generic source code 118 using an eABI-aware compiler 116. The common memory 166 may include a transit buffer 308 to facilitate the communication of notes between enclaves 104 and between pseudo enclaves 210. When an outbound note 290 is ready, it may be simultaneously stream-encrypted and copied to the transit buffer 308. Later, when the thread of execution 224 enters the called enclave, it may simultaneously copy and stream-decrypt the data 216 in the transit buffer 308 into an inbound note 292. The main-note 316 may initiate the execution of the workload 252 of the executable 110 after the runtime environment is initialized.

An outbound note 290 may be formed by an executable 110 and routed to the eABI-aware runtime 180. The outbound note 290 may also be formed by the enclave-aware compiler 122 from generic source code 118. The inbound note 292 may be received by an enclave 104 or a pseudo via the eABI-aware runtime 180. Processor instructions 120 to receive the inbound note 292 may be added by the enclave-aware compiler 122.

The encrypted note 302 may be unintelligible and may be encoded or encrypted. For example, the encrypted note 302 may include an unencrypted envelope that contains data 216 required to route the encrypted note 302. The encrypted note 302 may include mechanisms to prevent tampering with the envelope and/or replaying the encrypted note 302. The encrypted note 302 may further include an encrypted subroutine note 302.

The plaintext note 304 may be intelligible and may include plaintext subroutine-notes 304, notes that have yet to leave an enclave 104, notes being relayed without encryption, or encrypted notes 302 that have been decrypted. When the plaintext note 304 is a decrypted note 310, the decrypted note 310 may be validated to ensure that the decrypted note 310 was not altered during transit. The enclave-compatible cryptographic key 170 may be selected for encrypting a plaintext subroutine-note 304. The selection may be done concurrently (byte-by-byte) or by block.

The syscall-note 306 may be called from an enclave 104 to execute a restricted instruction 204. The syscall-note 306 may also be routed to a pseudo enclave 210, where the pseudo enclave 210 may execute the restricted instruction 204. For example, the syscall-note 306 may be used in the service of a standard library call or a system call 232. The note 212 may reference a symbol 194 in another enclave 104 or pseudo enclave 210. For example, the note 212 may be configured to semantically match the symbol 194 with a published symbol 194, identifying the enclave 104 that contains the published symbol 194. The note 212 may then be populated with interoperable data 312.

Routing a note 212 may include preparing the note 212, selecting a transit buffer 308, preparing and copying the note 212, transferring the note 212 the eABI-aware runtime 180, and dispatching the note 212. Once the note 212 is dispatched, the note 212 may be received by the target enclave 104. The target enclave 104 may then process 222 the note 212 and return a note 212 to the original enclave 104. Preparation may include selecting a data security mode 130 and preparing the note 212 according to the data security mode 130. For example, a note 212 formed inside an enclave 104 may not be accessed by software outside the enclave 104, therefore it must be copied to a transit buffer 308 before the thread of execution 224 leaves the enclave 104. The transit buffer 308 may be pre-allocated or allocated. The transit buffer 308 may be used only once and then deallocated. Alternatively, the transit buffer 308 may be used repeatedly. A transit buffer 308 may be selected based on the size or other attribute of the note 212. Preparing to encrypt the note 212 may include selecting an enclave-compatible cryptographic key 170 that is compatible with both the calling and called enclave 104, which may involve using enclave 104 features such as attestation to re-validate the called enclave 104. Once the enclave-compatible cryptographic key 170 and encryption method have been selected, the note 212 may now be encrypted. For example, copying the encrypted note 302 may include the use a stream cipher to stream a plaintext note 304 into a stream cipher and write the encrypted note 302 to the transit buffer 308. The thread of execution 224 may then exit the enclave 104 and enter the eABI-aware runtime 180. The eABI-aware runtime 180 may then examine the envelope of the note 212 and pass the thread of execution 224 to the target enclave 104 or pseudo enclave 210. The target enclave 104 may then select an enclave-compatible cryptographic key 170 that is compatible with the note 212 and the enclave 104. A region of memory 108 may be allocated within the target enclave 104 where the note 212 is then copied and stream-decrypted into the target enclave 104. The note 212 may then be examined to determine if the note 212 is a new call or if the note 212 is returning from an external call 214. If the note 212 is a new call, the target symbol 194 may be evaluated and sent to the appropriate chain of handlers based on the data security mode 130. If the note 212 returns from an earlier call, interoperable data 312 may be copied into the enclave 104 and the return value is returned to the caller. The target enclave 104 may process 222 the note 212, including the workload 252 specified by the note 212, until the thread of execution 224 is completed and ready to return to the original enclave 104. For example, this may include sending a return value. The routing process 222 may then be repeated, and the note 212 may be routed back to the original enclave 104, which may be decrypted if necessary.

The interoperable data 312 may include the following aspects. Interoperable data 312 may be stored in common memory 166, an enclave 104, or a note 212 passed between enclaves 104. Interoperable data 312 may be stored as deemed fit by the eABI-aware compiler 116. For example, interoperable data 312 may be a parameter passed from one function to another. In another example, interoperable data 312 may include a return value. Interoperable data may include a pointer to a data structure. In yet another example, interoperable data 312 may include the data structure pointed to by a pointer. One skilled in the art would appreciate that the examples provided are not exhaustive.

The data security mode 130 may include the following aspects. The data security mode 130 may include a plaintext mode 132, an encryption mode 134, a validation mode 136, an encryption with validation mode 138, or combinations thereof. The data security mode 130 may include an agreed upon level of security for passing a note 212 between two enclaves 104. For example, when an eABI-aware executable 112 is compiled, the enclave-aware compiler 122 may select the set of data security modes 130 that a library will accept for each of the published symbols 194. For example, the various security levels for symbols 194 may include a minimum-security mode, a default security mode, and a preferred security mode. A developer may have the ability to configure the data security modes 130 that are available for each symbol in each eABI-aware executable 112. A default data security mode 130 may be selected when a program is loaded and started. The data security mode 130 may be modified at safe points during program execution. It should be appreciated that the various modes of security allow the user to select the protection level depending on the importance of the security and time-cost of employing the security. One skilled in the art may utilize combinations and variants the data security modes 130 in this disclosure depending on the platform, enclave 104 technology used, or the requirement for resisting quantum attacks.

The plaintext mode 132 may allow a note 212 to be passed between enclaves, but the content of the note 212 may still be accessible to privileged processes 222. It should be appreciated that the plaintext mode 132 may be efficient in both speed and level of security resources. A variation of the plaintext mode 132 may include a note 212 that is digitally signed, which may impose a performance cost but detects notes 212 that have been altered in transit. The encryption mode 134 may include notes 212 that are encrypted as they are relayed through unprotected executables 110. Unprotected software may be able to prevent or delay the note 212 from being relayed, replay a note 212, or change the order of delivery of multiple notes 212. However, unauthorized software may not be able to interpret the contents of the note 212 or alter the note 212 without detection. This encryption mode 134 may use enclave 104 features to securely select an enclave-compatible cryptographic key 170 known only to the two enclaves 104 in communication. For example, this encryption mode 134 may cover a broad array of cryptographic and key-generation systems including Diffie-Hellman, block ciphers, stream ciphers, long-term shared keys, short-term shared keys, or key-pairs. Validation mode 136 may ensure interoperation with an authentic, genuine enclave 104. In another example, validation mode 136 may add protections against man-in-the-middle attacks and enclave 104 spoofing and may re-attest the enclaves 104 in communication with each other every time a note 212 is relayed or returned. In this context, re-attesting the enclaves 104 may include re-validating the enclaves 104. In another example, encryption with validation mode 138 may utilize unique encryption keys that are generated to relay each note 212. Furthermore, the enclaves 104 may re-validate each other before the note 212 is relayed. It should be appreciated that the encryption with validation mode 138 may maximize safety and security available via the eABI 114, but may result in a cost in terms of performance.

The published symbol 194 may represent interoperable data 312 such as functions, variables 286, or other identifiers within a source code 188. For example, a symbol table 314 may map these identifiers to their corresponding memory 108 addresses or offsets within an executable 110. Therefore, it should be appreciated that the symbol table 314 may be a critical component for linking, loading, and runtime symbol resolution. For example, symbols 194 may include local symbols, global symbols, debugging symbols, external symbols, and published symbols 194. The symbol table 314 may be included in an executable 110. For example, the system 100 may use the symbol tables 314 to identify interoperable data 312 between enclaves 104, allowing generic source code 118 to attain the safety and security benefits of enclaves 104. A published symbol 194 may be included in an executable 110. The symbol 194 may be identified by the eABI-aware compiler 116, including tracking the type, datatype, location, size, and other information about the symbol 194, and store information in one or more symbol tables 314. The symbol tables 314 may be subsequently stored in an eABI-aware executable 112. A published symbol 194 may be added to an eABI-aware enclave 104 that is available for external access by other eABI-aware enclaves 104. It should be appreciated that, while functions may be externally accessed unless they are specifically made private, for example in the C programming language, an enclave-aware compiler 122 may produce instructions 218 to securely resolve an external symbol dependency 184 or securely allow other enclaves 104 to access a published symbol 194. A published symbol 194 may be semantically matched to an external symbol dependency 184 by several methods. For example, by matching the name of the symbol 194, matching hashes of the symbol 194, or matching a symbol's 194 unique prototype including the name of the symbol 194 as well as the datatypes of its parameters. Semantically matching symbols 194 and external symbol dependencies 184 may require that the name and datatype of two symbols 194 are compatible with one another.

The external symbol dependency 184 may be any type of symbol 194, or a function. For example, the function printf( ) may be called but is not defined in the source. Therefore, the enclave-aware compiler 122 may identify "printf" as an external symbol dependency 184 in a symbol table 314. External symbol dependencies 184 may be identified by the name, hash, datatype, or protype of the symbol 194. External symbol dependencies 184 may be "by value" or "by reference." If "by reference," the data 216 may not be communicated faithfully, similar to the "deep copy" problem faced by object-oriented developers.

External calls 214 are fundamental to modular programming and allow developers to leverage other developers' innovation and expertise. For example, an external call 214 may be a subroutine call in an executable 110 that invokes a function defined outside the executable 110. The external call 214 may also transfer the thread of execution 224 to another executable 110 loaded in the same usermode process 150 and may rely on mechanisms, e.g. global offset tables and procedure linkage tables to facilitate interoperability. In another example, external calls 214 may also include ECALLs and OCALLs, where the source code 188 may be specifically written to utilize these external calls 214, and the source code 188 is compiled to run within an enclave 104. The eABI-aware compiler 116 may (1) identify an external symbol dependency 184 and add the external symbol dependency 184 to a symbol table 314 of external symbols, (2) identify a published symbol 194 and add the published symbol 194 to a symbol table 314 of published symbols 194, or (3) add an eABI 114 defined interface that initializes enclaves 104 and resolves symbols 194. For example, the eABI 114 may also implement an interface to resolve symbols. The enclave-aware loader 146, during enclave 104 initialization, may then invoke these interfaces inside of each enclave 104 that (a) tells each enclave 104 about every other enclave, (b) has each enclave 104 independently validate (attest) each other enclave 104 and setup cryptographic keys, (c) has each enclave 104 send a list of published symbols 194 to every other enclave, and (d) as each enclave 104 receives a list of published symbols 194 from other enclaves, it semantically matches the symbol with the enclave's 104 external symbol dependencies 184. For each match, the enclave 104 securely stores which external enclave 104 publishes that symbol. When an external symbol is needed, the enclave 104 composes a note 212. Because the symbol was matched during enclave 104 initialization, the note 212's envelope may include the enclave ID that publishes the symbol. The eABI-aware runtime 180 uses the information in the note 212 to dispatch the thread of execution 224 to an enclave 104 that publishes the symbol 194. Finally, the enclave 104 publishes the published symbol 194, receives the note 212, validates it, prepares it for use within the enclave 104, and then routes the thread of execution 224 to the published symbol 194.

As shown in FIG. 20, a method 400 for enhancing security in a computing environment 102 that supports an enclave 104 is provided. The method 400 may include a step 402 of providing an enclave-aware processor 124, a memory 108 including a common virtual address space 220, a usermode process 150, and an enclave-aware executable 126, an enclave-aware loader 146, and an eABI 114. The enclave-aware loader 146 may be configured to analyze the enclave-aware executable 126, create an instance of an enclave 104 in the memory 108, provision the usermode process 150 to interoperate with the enclave 104, add a portion of the enclave-aware executable 126 into the enclave 104, and initialize the enclave 104. Once initiated, the enclave 104 may interoperate with the usermode process 150. The enclave-aware executable 126 may run within the common virtual address space 220. The common virtual address space 220 may include a common memory 166. The common virtual address space 220 may also include a pseudo library 208. The enclave-aware loader 146 may be configured to analyze the pseudo library 208. The enclave-aware loader 146 may create an instance of a pseudo enclave 210 in the common memory 166. The enclave-aware loader 146 may add a portion of the pseudo library 208 into the pseudo enclave 210. The enclave-aware loader 146 may initialize the pseudo enclave 210. The pseudo enclave 210 may also interoperate with the usermode process 150 via the eABI 114. The method 400 may include a step 404 of creating a plurality of enclaves 104 via the enclave-aware loader 146 where the plurality of enclaves 104 includes a first enclave 316 and a second enclave 320. The method 400 may include a step 406 of loading the first enclave 316 and the second enclave 320 in the common virtual address space 220. The method 400 may then include a step 408 of forming a note 212 via the first enclave 316. The note 212 may include interoperable data 312. The method 400 may include a step 410 of processing the note 212 via the second enclave 320, allowing the first enclave 316 and the second enclave 320 to interoperate via the eABI 114.

As shown in FIG. 21, a method 500 for enhancing security in a computing environment 102 that supports an enclave 104 is provided. The method 500 may include a step 502 of providing an enclave-aware processor 124, a memory 108 including a common virtual address space 220, a usermode process 150, and an enclave-aware executable 126, an enclave-aware loader 146, and an eABI 114. The enclave-aware loader 146 may be configured to analyze the enclave-aware executable 126, create an instance of an enclave 104 in the memory 108, provision the usermode process 150 to interoperate with the enclave 104, add a portion of the enclave-aware executable 126 into the enclave 104, and initialize the enclave 104. Once initiated, the enclave 104 may interoperate with the usermode process 150. The enclave-aware executable 126 may run within the common virtual address space 220. The common virtual address space 220 may include a common memory 166. The common virtual address space 220 may also include a pseudo library 208. The enclave-aware loader 146 may be configured to analyze the pseudo library 208. The enclave-aware loader 146 may create an instance of a pseudo enclave 210 in the common memory 166. The enclave-aware loader 146 may add a portion of the pseudo library 208 into the pseudo enclave 210. The enclave-aware loader 146 may initialize the pseudo enclave 210. The pseudo enclave 210 may also interoperate with the usermode process 150 via the eABI 114. The method 500 may include a step 504 of creating a plurality of enclaves 104 via the enclave-aware loader 146 where the plurality of enclaves 104 includes a first enclave 316 and a second enclave 320. The method 500 may include a step 506 of loading the first enclave 316 and the second enclave 320 in the common virtual address space 220. The method 500 may then include a step 508 of forming a note 212 via the first enclave 316. The note 212 may include interoperable data 312. The method 500 may include a step 510 of processing the note 212 via the second enclave 320, allowing the first enclave 316 and the second enclave 320 to interoperate via the eABI 114. The method 500 may then include a step 512 of providing an eABI-aware runtime 180. The method 500 may include a step 514 of relaying the note 212 from the first enclave 316 to the eABI-aware runtime 180. The method 500 may include a step 516 of dispatching the note 212 from the eABI-aware runtime 180 to the second enclave 320.

As shown in FIG. 22, a method 600 for enhancing security in a computing environment 102 that supports an enclave 104 is provided. The method 600 may include a step 602 of providing an enclave-aware processor 124, a memory 108 in communication with the enclave-aware processor 124, an enclave-aware loader 146, a usermode process 150, an enclave-aware executable 126, a certificate 168, an enclave-compatible cryptographic key 170 associated with the certificate 168, a PKI 172, and a production mode 174. The production mode 174 may include an active state 178. The enclave-aware loader 146 may be configured to analyze the enclave-aware executable 126. The enclave-aware loader 146 may be configured to create an instance of an enclave 104 in the memory 108. The enclave-aware loader 146 may be configured to provision the usermode process 150 to interoperate with the enclave 104. The enclave-aware loader 146 may be configured to add a portion of the enclave-aware executable 126 into the enclave 104. The enclave-aware loader 146 may also initialize the enclave 104. Once initiated, the enclave 104 may be configured to interoperate with the usermode process 150. The enclave-aware loader 146 may be configured to verify the enclave 104 is initialized with the enclave-compatible cryptographic key 170 associated with the certificate 168. The system's 100 computing environment 102 may be configured to trust every certificate 168 via the PKI 172 when the production mode 174 is in the active state 178. The method 600 may include a step 604 of deriving the certificate 168 from the PKI 172. The amount of time that passes between when a certificate 168 is derived and when a certificate 168 is verified may vary, including extensive delays. The method 600 may then include a step 606 of binding the enclave-compatible cryptographic key 170 to the certificate 168. The method 600 may include a step 608 of verifying the enclave-compatible cryptographic key 170 is associated with the certificate 168. The method 600 may include a step 610 of verifying that the certificate 168 is valid. The method 600 may include a step 612 of verifying that the certificate 168 is derived from the PKI 172. The amount of time that passes between when a certificate 168 is derived and when a certificate 168 is verified may vary, including extensive delays. The method 600 may include a step 614 of initializing the enclave 104 using the enclave-compatible cryptographic key 170.

As shown in FIGS. 23A and 23B, a method 700 for enhancing security in a computing environment 102 that supports an enclave 104 is provided. The method 700 may include a step 702 of providing an eABI-aware executable 112 including an eABI-aware main executable 182, the eABI-aware main executable 182 including an external symbol dependency 184, an eABI-aware runtime 180, and an entry/exit bootstrap module 288. The method 700 may include a step 704 of providing a loading sub-process 222 on an eABI-aware executable 112. The loading sub-process 222 may be configured to analyze the eABI-aware executable 112. The loading sub-process 222 may also be configured to load a portion of an unprotected section 154 of the eABI-aware executable 112 into a common memory 166 when the eABI-aware executable 112 includes the unprotected section 154. The loading sub-process 222 may be configured to load a portion of a protected section 156 of the eABI-aware executable 112 into an enclave 104 when the eABI-aware executable 112 includes the protected section 156. The loading sub-process 222 may be configured to evaluate the eABI-aware executable 112 for an un-loaded dependent executable 280 including a published symbol 194. The loading sub-process 222 may be configured to then recursively perform the loading sub-process 222 on the un-loaded dependent executable 280 for each un-loaded dependent executable 280. The method 700 may include a step 706 of performing the loading sub-process 222 on the eABI-aware main executable 182. The method 700 may include a step 708 of loading the eABI-aware runtime 180 into memory 108. The method 700 may include a step 710 of loading the entry/exit bootstrap module 288 into memory 108. The method 700 may then include a step 712 of creating a thread of execution 224. The method 700 may include a step 714 of initializing each instance of the eABI-aware executable 112. The method 700 may also include a step 716 of resolving the external symbol dependency 184 to the published symbol 194. The method 700 may include a step 718 of transferring the thread of execution 224 to the entry/exit bootstrap module 288.

As shown in FIGS. 24A and 24B, the method 800 of FIGS. 23A and 23B may further include the following steps. The method 800 may include a step 802 of providing an enclave-aware executable 126, a production mode 174, a PKI 172, and an enclave-compatible cryptographic key 170. For example, this step 804 may occur when the loading sub-process 222 loads a portion of a protected section 156 of the eABI-aware executable 112 into an enclave 104 when the eABI-aware executable 112 includes the protected section 156, the method 800 may include a step 806 of providing an enclave-aware executable 126, a production mode 174, a PKI 172, and an enclave-compatible cryptographic key 170. The method 800 may then include a step 808 of creating an enclave 104 in memory 108. The method 800 may include a step 810 of adding a portion of the protected section 156 of the enclave-aware executable 126 into the enclave 104. The method 800 may then include a step 812 of extracting a certificate 168 from the enclave-aware executable 126. The method 800 may include a step 814 of verifying that the certificate 168 is valid. The method 800 may include a step 816 of accessing a PKI 172. The method 800 may include a step 818 of verifying the enclave-compatible cryptographic key 170 is associated with the certificate 168. The method 800 may also include a step 820 of verifying the PKI 172. The method 800 may include a step 822 of accessing a production mode 174. The method 800 may include a step 824 of verifying the compatibility of the production mode 174 and the certificate 168. The method 800 may include a step 826 of extracting the enclave-compatible cryptographic key 170 from the enclave-aware executable 126. The method 800 may include a step 828 of verifying the enclave-compatible cryptographic key 170 is associated with the certificate 168. The method 800 may include a step 830 of initializing the enclave 104 with the enclave-compatible cryptographic key 170.

The system 100 may also include a non-transitory computer-readable medium, as shown in FIGS. 3B and 7B through 19. The non-transitory computer-readable medium may store enclave-aware instructions 128. When executed by an enclave-aware processor 124, the enclave-aware instruction 128 may cause the enclave-aware processor 124 to analyze an enclave-aware executable 126. The enclave-aware processor 124 may also create an instance of an enclave 104 inside a usermode process 150. The enclave-aware processor 124 may then load portions of the enclave-aware executable 126 into the enclave 104. The enclave-aware processor 124 may initialize the enclave 104, allowing the enclave 104 to interoperate with the usermode process 150.

Advantageously, the present technology addresses significant security vulnerabilities identified in the prior art by providing a robust method and system 100 for enhancing security in computing environments 102. By automating the process 222 of loading executables 110 into enclaves 104 with an integrated enclave-aware loader 146, the present technology streamlines the enclave 104 creation process 222 and mitigates the risks of unauthorized data 216 access and manipulation by external processes 222 or malicious entities. Furthermore, the use of encrypted notes 302 for data sharing between enclaves, underpinned by the eABI 114, ensures that data integrity and confidentiality are maintained, overcoming the challenges of data 216 breaches and elevated privilege attacks that have plagued previous systems. The present technology not only fortifies the security landscape of digital systems but also provides a scalable and efficient framework for automated secure computing for users of all levels of computer proficiency, thereby addressing the critical needs for privacy and data protection in modern computing environments 102.

EXAMPLES

Example embodiments of the present technology are provided with reference to the several figures including FIGS. 3B and 7B through 24B enclosed herewith.

Example 1: Production Mode

Consider two laptops. They both have a production mode that is securely set in the UEFI. The enclave-aware loader is able to securely access the state of the production mode, as shown below:

Laptop 1: A laptop used by the CEO of a bank. The CEO is unlikely to develop software, therefore it is unlikely that the CEO would ever run an unsigned program. Furthermore, the CEO is likely a target of attackers. Therefore, the CEO's laptop's Production Mode is active. The enclave-aware loader will ensure that every enclave-aware executable was signed by an entity trusted by the bank.

Laptop 2: A laptop used by a Computer Engineering student. The student is actively developing software that, when compiled, has never run on another computer. Most of the executables are for testing and are unsigned. Furthermore, the developer is experimenting with unsigned executables and libraries from other students and professors. Therefore, the student's laptop's Production Mode is not active.

Example 2: Load-time Data Security Mode

Consider how the same two users, the CEO and the student, utilize a load-time data security mode:

Laptop 1: The CEO's laptop has a setting on the desktop that adjusts the data security mode. When the mode is at a lower setting, applications seem to run faster. The bank, however, has a group policy that sets a minimum data security mode. Therefore, not even the CEO can run applications using a substandard data security mode.

Laptop 2: The student runs a lot of programs from the command line. The student has an assignment to profile the performance penalty of various data security modes. The student sets an environment variable, DATA_SECURITY-_MODE and then measures the execution time of a program. The student compiles the data and determines if the cost in terms of performance is worth the added security.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. A system for enhancing security in a computing environment that supports an enclave, the system comprising:
   an enclave-aware processor;
   a memory in communication with the enclave-aware processor, the memory including an enclave-aware loader and a usermode process; and
   an enclave-aware executable, the enclave-aware executable including an executable compiled to be added to the enclave and operate within the enclave;

wherein:
   the enclave-aware loader is configured to load an unprotected section into a common memory; and
   the enclave-aware loader is further configured to:
      facilitate a loading of the enclave-aware executable within the enclave,
      analyze the enclave-aware executable,
      create an instance of an enclave in the memory,
      add a portion of the enclave-aware executable into the enclave,
      initialize the enclave, and
      provision the usermode process to interoperate with the enclave; and
   the enclave is configured to interoperate with the usermode process.

2. The system of claim 1, further comprising an enclave-aware Application Binary Interface (eABI), a common virtual address space, the common virtual address space including the common memory, and a pseudo library, wherein:
   the enclave-aware processor is configured to execute a restricted instruction;
   the enclave-aware loader is configured to analyze the pseudo library, create an instance of a pseudo enclave in the common memory, add a portion of the pseudo library into the pseudo enclave, and initialize the pseudo enclave; and
   the pseudo enclave is configured to execute the restricted instruction and interoperate with the usermode process via the eABI.

3. The system of claim 2, wherein the enclave-aware executable includes a section, the section including a member selected from a group consisting of a protected text section, an unprotected text section, a protected data section, an unprotected data section, and combinations thereof, wherein:
   the enclave-aware loader is configured to load a portion of the protected text section into the enclave when the enclave-aware executable includes the protected text section, load a portion of the protected data section into the enclave when the enclave-aware executable includes the protected data section, load a portion of the unprotected text section into the common memory when the enclave-aware executable includes the unprotected text section, and load a portion of the unprotected data section into the common memory when the enclave-aware executable includes the unprotected data section; and
   the enclave-aware executable is configured to run within the common virtual address space.

4. The system of claim 1, further comprising an eABI-aware runtime, wherein:
   the enclave-aware loader is further configured to load the eABI-aware runtime into memory, and initialize the eABI-aware runtime; and
   the eABI-aware runtime is configured to interoperate with the enclave.

5. The system of claim 1, further comprising an eABI-aware library and an eABI-aware executable, the eABI-aware library including a published symbol, and the eABI-aware executable including an external symbol dependency, wherein:
   the enclave-aware loader is further configured to resolve the external symbol dependency to the published symbol; and
   the external symbol dependency is configured to access the published symbol.

6. The system of claim 1, further comprising a data security mode, the data security mode including a member selected from a group consisting of a plaintext mode, an encryption mode, a validation mode, an encryption with validation mode, and combinations thereof.

7. The system of claim 1, further comprising a certificate, and an enclave-compatible cryptographic key associated with the certificate, wherein the enclave-aware loader is further configured to verify the enclave is initialized with the enclave-compatible cryptographic key associated with the certificate.

8. The system of claim 7, further comprising a computing environment, a certificate-based public key infrastructure, and a production mode, the production mode including an active state, wherein the computing environment is configured to trust every certificate via the certificate-based public key infrastructure when the production mode is in the active state.

9. The system of claim 1, further comprising an enclave-aware Application Binary Interface (eABI) and a generic source code, wherein:

the memory further includes an enclave-aware compiler configured to translate a portion of the generic source code into the enclave-aware executable, the enclave-aware executable including enclave-aware instructions configured to interoperate with an enclave, and processor instructions configured to interoperate between the enclave and the usermode process via the eABI; and the enclave-aware processor is configured to execute the processor instructions and the enclave-aware instructions.

10. The system of claim 1, the memory further including an eABI-aware runtime, wherein the usermode process is configured to interoperate with the enclave via the eABI-aware runtime.

11. The system of claim 1, further comprising an enclave-aware Application Binary Interface (eABI) and a generic source code, wherein:

the enclave-aware processor is configured to execute processor instructions and enclave-aware instructions;

the memory further includes an enclave-aware compiler and an eABI-aware runtime;

the enclave-aware compiler is configured to translate a portion of the generic source code into the enclave-aware executable, the enclave-aware executable including enclave-aware instructions and processor instructions;

the enclave-aware instructions configured to interoperate with an enclave;

the processor instructions configured to interoperate between the enclave and the usermode process via the eABI; and the usermode process is configured to interoperate with the enclave via the eABI-aware runtime.

12. The system of claim 1, further comprising a production mode, the production mode including an active state, wherein the computing environment is configured to trust every enclave via the enclave-aware loader when the production mode is in the active state.

13. A non-transitory computer-readable medium storing enclave-aware instructions that, when executed by an enclave-aware processor, cause the enclave-aware processor to:

analyze an enclave-aware executable via an enclave-aware loader, the enclave-aware executable including an executable compiled to be added to an enclave and operate within the enclave, the enclave-aware loader configured to load a protected section of the enclave-aware executable into the enclave, the enclave-aware loader further configured to load an unprotected section into a common memory;

create an instance of the enclave inside a usermode process via the enclave-aware loader;

load the protected section of the enclave-aware executable into the enclave via the enclave-aware loader; and initialize the enclave;

wherein the enclave interoperates with the usermode process.

14. A system for enhancing security in a computing environment that supports an enclave, the system comprising:

an enclave-aware processor, the enclave-aware processor is configured to execute processor instructions and enclave-aware instructions;

the enclave-aware instructions configured to interoperate with the enclave;

an enclave-aware Application Binary Interface (eABI);

a memory in communication with the enclave-aware processor, the memory including an enclave-aware loader, a usermode process, and an eABI-aware runtime;

a common virtual address space, the common virtual address space including a common memory;

an enclave-aware executable including:

an executable compiled to be added to the enclave and operate within the enclave, a certificate, an enclave-compatible cryptographic key associated with the certificate, and a section, the section including a member selected from a group consisting of a protected text section including an enclave-aware instruction, an unprotected text section, a protected data section, an unprotected data section, and combinations thereof;

a data security mode including a member selected from a group consisting of a plaintext mode, an encryption mode, a validation mode, an encryption with validation mode, and combinations thereof; and a production mode including an active state, wherein the computing environment is configured to trust every certificate via a certificate-based public key infrastructure when the production mode is in the active state;

wherein:

the enclave-aware loader is configured to facilitate a loading of the enclave-aware executable within the enclave by:

analyzing the enclave-aware executable, creating an instance of the enclave in the memory, loading a portion of the protected text section into the enclave when the enclave-aware executable includes the protected text section, load a portion of the protected data section into the enclave when the enclave-aware executable includes the protected data section, load a portion of the unprotected text section into the common memory when the enclave-aware executable includes the unprotected text section, and load a portion of the unprotected data section into the common memory when the enclave-aware executable includes the unprotected data section, initializing the enclave, and verifying the enclave is initialized with the enclave-compatible cryptographic key associated with the certificate;

the enclave-aware loader is further configured to:
  load the eABI-aware runtime into the memory, and initialize the eABI-aware runtime;
the eABI-aware runtime is configured to interoperate with the enclave;
the enclave is configured to interoperate with the usermode process; and
the usermode process is configured to interoperate with the enclave via the eABI-aware runtime.

15. The system of claim 14, further comprising a pseudo library in the common memory, wherein:
  the enclave-aware processor is configured to execute a restricted instruction;
  the enclave-aware loader is configured to analyze the pseudo library, create an instance of a pseudo enclave in the common memory, add a portion of the pseudo library into the pseudo enclave, and initialize the pseudo enclave; and
  the pseudo enclave is configured to execute the restricted instruction and interoperate with the usermode process via the eABI.

16. The system of claim 15, wherein:
  the enclave-aware executable further comprising an external symbol dependency;
  the pseudo library further comprising a published symbol;
  the enclave-aware loader is further configured to resolve the external symbol dependency to the published symbol; and
  the external symbol dependency is configured to access the published symbol.

17. The system of claim 14, further comprising a generic source code, wherein:
  the memory further includes an enclave-aware compiler; and
  the enclave-aware compiler is configured to translate a portion of the generic source code into the enclave-aware executable, the enclave-aware executable including an enclave-aware instruction and a processor instruction.

* * * * *